US008881150B2

(12) United States Patent
Sawa et al.

(10) Patent No.: US 8,881,150 B2
(45) Date of Patent: Nov. 4, 2014

(54) VIRTUAL MACHINE, VIRTUAL MACHINE SYSTEM AND METHOD FOR CONTROLLING VIRTUAL MACHINE

(71) Applicant: Hitachi, Ltd., Tokyo (JP)

(72) Inventors: Yuta Sawa, Tokyo (JP); Naoya Hattori, Yokohama (JP); Yuji Tsushima, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 169 days.

(21) Appl. No.: 13/648,626

(22) Filed: Oct. 10, 2012

(65) Prior Publication Data

US 2013/0275972 A1  Oct. 17, 2013

(30) Foreign Application Priority Data

Oct. 11, 2011 (JP) ................................. 2011-223566

(51) Int. Cl.
 G06F 9/455 (2006.01)
 G06F 13/10 (2006.01)
(52) U.S. Cl.
 CPC .................................. *G06F 13/102* (2013.01)
 USPC .............................................................. 718/1

(58) Field of Classification Search
 None
 See application file for complete search history.

(56) References Cited

U.S. PATENT DOCUMENTS

| 6,496,847 B1 | 12/2002 | Bugnion et al. | |
| 7,761,612 B2 * | 7/2010 | Corry et al. | 710/8 |
| 2010/0169883 A1 * | 7/2010 | Bogin et al. | 718/1 |

OTHER PUBLICATIONS

Single Root I/O Virtualization and Sharing Specification, Revision 1.0; Sep. 11, 2007; PCI-SIG; pp. 1-84.

* cited by examiner

*Primary Examiner* — Diem Cao
(74) *Attorney, Agent, or Firm* — Foley & Lardner LLP

(57) ABSTRACT

In an exemplary computing machine of the invention, a shared IO device used by a first virtual machine and the second virtual machine includes a physical IO device and a virtual IO device controlled by the physical IO device. In the case of detecting that the first driver has transmitted a stop signal for stopping the physical IO device, a hypervisor keeps the stop signal from being transmitted to the shared IO device, determines whether or not a processing request transmitted by the second driver to the virtual IO device has been completed, and stops the physical IO device with the completion of the processing request as a trigger.

15 Claims, 21 Drawing Sheets

|  | USER VIRTUAL MACHINE ID (c101) | GUEST PHYSICAL ADDRESS RANGE (c102) | OFFSET (c103) | ACCESSIBILITY FLAG (c104) |
|---|---|---|---|---|
| LINE 1 | 1 | 0x010000-0x03fff | 0x100000 | ALLOWED |
| LINE 2 | 1 | 0x402000-0x407fff | -0x100000 | ALLOWED |
| LINE 3 | 1 | 0x600000-0x6fffff | 0x200000 | DENIED |
| LINE 4 | 2 | 0x010000-0x04ffff | 0x100000 | ALLOWED |
| LINE 5 | 2 | 0x110000-0x14ffff | 0x100000 | ALLOWED |

FIG. 5

| PF IDENTIFICATION NUMBER c201 | VF IDENTIFICATION NUMBER c202 | USER VIRTUAL MACHINE ID c203 | GUEST PHYSICAL ADDRESS RANGE c204 | WAITING TIME c205 |
|---|---|---|---|---|
| LINE 1 | 1 | 1 | 1 | 0x010000-0x03ffff | 10 msec |
| LINE 2 | 1 | 2 | 1 | 0x402000-0x407fff | 10 msec |
| LINE 3 | 2 | 3 | 1 | 0x600000-0x6fffff | 1 msec |
| LINE 4 | 2 | 4 | 2 | 0x010000-0x04ffff | 100 msec |

FIG. 6

| CONSOLE | | | |
|---|---|---|---|
| PF IDENTIFICATION NUMBER | VF IDENTIFICATION NUMBER | WAITING TIME | |
| 1 | 1 | 10 | msec |
| 1 | 2 | 10 | msec |
| 1 | 3 | 1 | msec |
| 1 | 4 | 100 | msec |

APPLY b7

FIG. 10

| USER VIRTUAL MACHINE ID (c301) | CONTINUOUS RUNNING TIME (c302) | EXECUTABILITY FLAG (c303) | EXECUTION STATUS (c304) |
|---|---|---|---|
| 1 | 10 msec | EXECUTABLE | EXECUTING |
| 2 | 10 msec | EXECUTABLE | SUSPENDED |
| 3 | 5 msec | EXECUTABLE | SUSPENDED |
| 4 | 10 msec | INEXECUTABLE | SUSPENDED |

FIG. 17

| OPERATION ID | OPERATOR | ACCESS TIME |
|---|---|---|
| 1 | USER VIRTUAL MACHINE 1 | 2011/01/01 05:01:02 |
| 2 | USER VIRTUAL MACHINE 2 | 2011/01/01 05:01:07 |
| 3 | USER VIRTUAL MACHINE 1 | 2011/01/01 05:01:09 |
| 4 | HYPERVISOR | 2011/01/01 05:01:20 |

FIG. 18

VIRTUAL MACHINE, VIRTUAL MACHINE SYSTEM AND METHOD FOR CONTROLLING VIRTUAL MACHINE

CLAIM OF PRIORITY

The present application claims priority from Japanese patent application JP2011-223566 filed on Oct. 11, 2011, the content of which is hereby incorporated by reference into this application.

BACKGROUND OF THE INVENTION

This invention relates to a virtual machine system, and more particularly, to a technology, which is used in a virtual machine system where a plurality of virtual machines are run on a physical computer while sharing an I/O device, of keeping the physical computer from shutting down.

Physical computers are used widely in the forms of commercial servers and personal computers (PCs). A problem of conventional physical computers is that one OS at most can be run on one physical computer. To address this problem, a virtual machine monitor (VMM) technology has been developed in which a plurality of virtual machines and a hypervisor for managing the plurality of virtual machines are run on one physical computer as disclosed in U.S. Pat. No. 6,496,847. For instance, with the technology of U.S. Pat. No. 6,496,847, a plurality of OSs can be simultaneously run on a single computer by running separate OSs on a plurality of virtual machines.

The technology disclosed in U.S. Pat. No. 6,496,847 enables a plurality of virtual machines to share a single IO device on a physical computer so that each virtual machine can use an input/output (IO) device. The sharing is accomplished by virtualizing the IO device with a VMM and allocating the resultant virtual IO devices to the respective virtual machines while switching the allocation in a time-sharing manner. However, this IO device sharing involves a large overhead and has resulted in the practice of overhead reduction that has begun around the year 2009 and that uses Single Root I/O Virtualization (SR-IOV), which is a standardized technology disclosed in Single Root I/O Virtualization and Sharing Specification Revision 1.0. According to Single Root I/O Virtualization and Sharing Specification Revision 1.0, which is the specification of SR-IOV, a device compliant with SR-IOV has Physical Functions (PFs) and Virtual Functions (VFs), which are expansions of functions installed in a conventional IO device. PFs include a function capable of controlling the overall initialization of the IO device, the generation of a VF, and the like. VFs, on the other hand, provide an input/output function that is provided by a conventional I/O device.

SUMMARY OF THE INVENTION

In a virtual machine system that uses, for example, a physical input/output (IO) device with such a sharing function as that of the SR-IOV device described above (this type of IO device is hereinafter referred to as IOV device), a plurality of virtual machines running on one physical computer use one IOV device to execute input/output (IO) processing. For instance, in the case where a management virtual machine, which is a virtual machine used by a system administrator, resets a PF of an IOV device whose VF is being used by a running user virtual machine, which is a virtual machine for a user, or otherwise causes the PF to stop for maintenance or the like, the entire by device including the VF comes to a halt. Even when an explicit command for a reset or a similar operation is not issued, device specifications may call for a reset at the time the configuration of the IOV device is changed, thereby causing the suspension or reboot of the entire IO device. In those cases, because of a time lag between the start and completion of IO processing of the VF, pending IO processing that originates from the VF is left in a root bridge to which the IOV device is connected. The IOV device which is halted cannot respond to the pending IO processing that originates from the VF, and the pending IO processing that originates from the VF remains in the root bridge. Ultimately, the root bridge detects a timeout for the pending IO processing, determines that a system error has occurred, and shuts down the physical computer.

Sharing one IOV device among a plurality of virtual machines to use for IO processing thus has a risk of lowering the reliability of the virtual machines and the virtual machine system as a stopped PF causes pending IO processing that originates from a VF to remain and consequently causes the physical computer to shut down.

It is an object of this invention to solve the problem described above, and to provide a virtual machine and a virtual machine system which prevent a physical computer where a plurality of virtual machines sharing an I/O device run from shutting down when pending IO processing that originates from a VF remains, and a control method for use in the virtual machine and the virtual machine system.

An aspect of this invention is a computing machine, including: a memory for storing a first virtual machine, a second virtual machine, and a hypervisor, which manages the first virtual machine and the second virtual machine; and a shared IO device which is used by the first virtual machine and the second virtual machine. The shared IO device includes a physical IO device and a virtual IO device which is controlled by the physical IO device. The first virtual machine includes a first driver for controlling the physical IO device. The second virtual machine includes a second driver for controlling the virtual IO device. In a case where the hypervisor detects that the first driver has transmitted a stop signal for stopping the physical IO device, the hypervisor keeps the stop signal from being transmitted to the shared IO device. The hypervisor determines whether or not a processing request that has been transmitted by the second driver to the virtual IO device has been completed. The hypervisor stops the physical IO device with the completion of the processing request that has been transmitted by the second driver to the virtual IO device as a trigger.

This invention allows a PF of an IO device shared by a plurality of virtual machines to stop after every IO processing procedure that originates from a VF is completed. This prevents the shutting down of a physical computer due to stopping the PF, thereby improving the reliability of the virtual machines and a virtual machine system that includes the virtual machines.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIG. 5 is a table chart illustrating a configuration example of the address protection mechanism.

FIG. 6 is a table chart illustrating a configuration example of a VF allocation table.

FIG. 10 is a block diagram illustrating a configuration example of a user interface for applying a waiting time to a VF.

FIG. 17 is a table chart illustrating a configuration example of a virtual machine schedule table.

FIG. 18 is a table chart illustrating a configuration example of an in-flight operation list.

DETAILED DESCRIPTION OF THE EMBODIMENTS

Various embodiments of this invention are described below with reference to the drawings.

First Embodiment

A first embodiment of this invention first presents a configuration example of a computing machine that embodies this invention, gives an overview, and then describes details.

Figure 1:
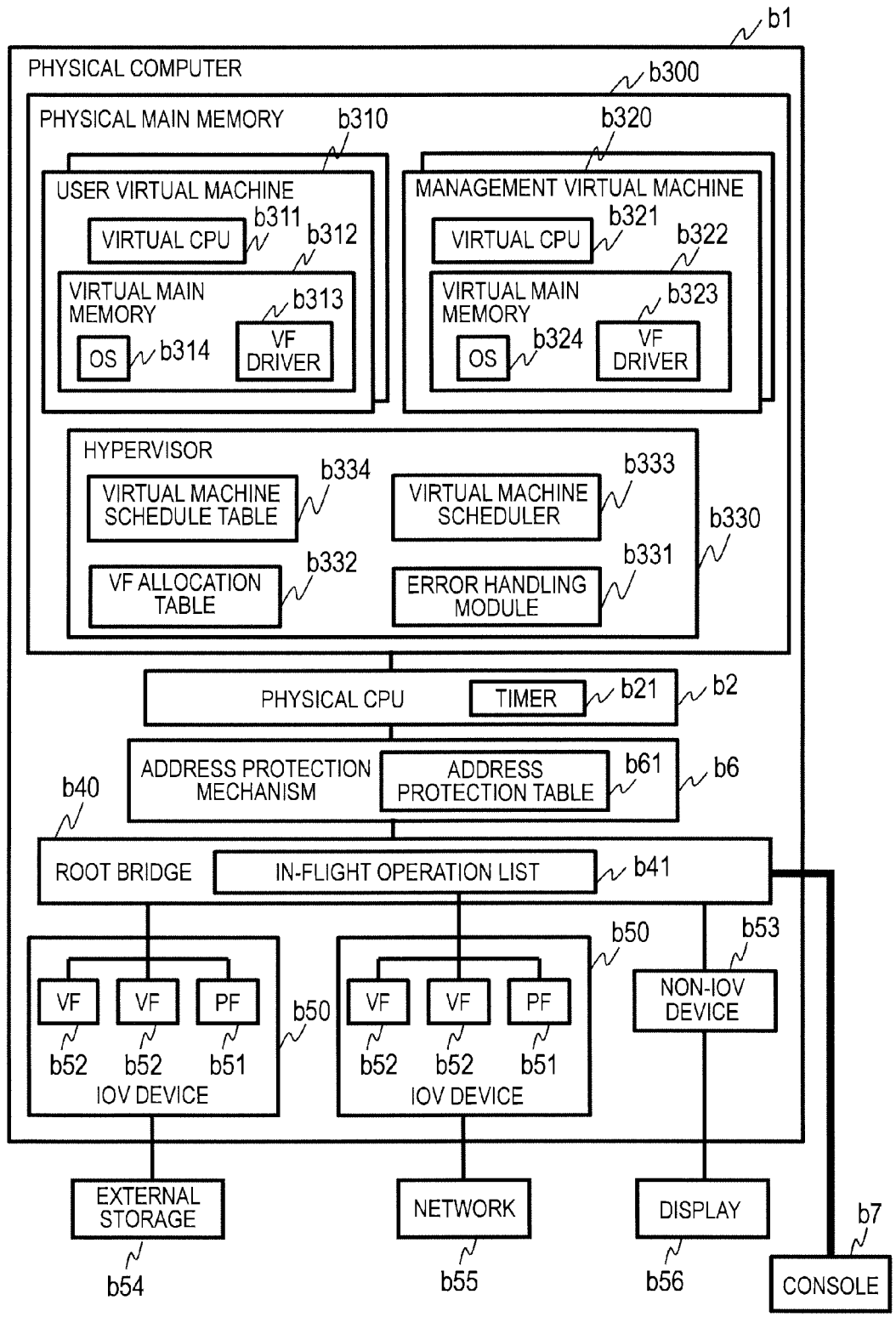
FIG. 1 is a block diagram illustrating an example of a system configuration according to embodiments of this invention.

FIG. 1 illustrates the configuration of a physical computer in this embodiment. Main components included in the physical computer, which is denoted by b1, include a physical CPU b2, a physical main memory b300, a root bridge b40, IO virtualization (IOV) devices b50, and an address protection mechanism b6. A console b7 is externally connected to the physical computer. This embodiment can be carried out with modules that have functions similar to the functions of those components. For example, in recent years, the root bridge b40 and the address protection mechanism b6 are sometimes sold packaged in the same chip that holds a CPU. In other packaging designs, a part of or entirety of the address protection mechanism is packaged as software in a hypervisor. A plurality of sets of those function blocks may also be installed in the physical computer. The description of this embodiment uses PCI terms, but this invention as a whole is not limited to PCI and PCI-compatible protocols such as PCI-X and PCI Express. The components are described in order. The physical CPU b2 has a timer b21 inside to measure an elapse of time from one point in time to another, and can know that a given period of time has passed.

The physical main memory b300 stores a user virtual machine b310, a management virtual machine b320, and a hypervisor b330. Command programs that a CPU can execute are written in those components, and are executed by the physical CPU (b2), thereby putting those components in operation. A virtual CPU b311 and a virtual main memory b312 are inside the user virtual machine b310, thus enabling the user virtual machine b310 to operate the same way as a physical computer. The virtual main memory b312 stores a VF driver b313. The VF driver b313, which usually cooperates with an operating system (OS) b314 stored in the virtual main memory b312, does not always need to be dependent on the OS. For instance, the VF driver 313 may cooperate with a Basic Input/Output System (BIOS), Extensible Firmware Interface (EFI), or other types of firmware stored in the virtual main memory b312, or may operate alone.

In the case where a virtual machine monitor (VMM) is run in the virtual main memory b312, the VF driver b313 may further cooperate with the VMM. This embodiment describes only a case where the VF driver b313 cooperates with the OS b314, which is a representative configuration. The description also applies to, for example, a case where the VF driver b313 cooperates with a BIOS if "OS 314" in the description is replaced by "BIOS". Similarly, the management virtual machine b320 includes a virtual CPU b321 and a virtual main memory b322, and can thus operate the same way as the user virtual machine b310. The virtual main memory b322 stores a PF driver b323, which cooperates with an OS b324.

The physical main memory b300 may store a plurality of user virtual machines b310 and a plurality of management virtual machines b320. In that case, one of the plurality of user virtual machines b310 has the virtual CPU b311 and the virtual main memory b312 that are separate from the virtual CPU b311 and the virtual main memory b312 in another of the plurality of user virtual machines b310, and one of the plurality of management virtual machines b320 has the virtual CPU b321 and the virtual main memory b322 that are separate from the virtual CPU b321 and the virtual main memory b322 in another of the plurality of management virtual machines b320. On the other hand, one VF driver b313 and one PF driver b323 at minimum are sufficient. In other words, not all of the user virtual machines b310 need to have the VF driver b313 and, similarly, not all of the management virtual machines b320 need to have the PF driver b323. When there are a plurality of user virtual machines b310, each user virtual machine has a unique user virtual machine ID.

The management virtual machine b320 does not always need to be a function block separate from the hypervisor b330. In the case where the management virtual machine b320 is not a separate function block, the PF driver is incorporated in, for example, the hypervisor. The OS b324 may also be omitted in some cases.

The hypervisor b330 is a mechanism for running a plurality of virtual machines including the user virtual machine b310 and the management virtual machine b320 in the physical computer b1. The hypervisor b330, which is stored in the physical main memory in this embodiment, does not always need to be stored in the physical main memory and the physical computer may be configured so as to include, for example, hardware that has a similar function. The hypervisor b330 stores an error handling module b331, a VF allocation table b332, a virtual machine scheduler b333, and a virtual machine schedule table b334. The behavior of the error handling module b331 is described later with reference to FIG. 2 and the subsequent figures. The CPU executes those programs and stores results of processing of the programs in the main memory.

The IOV devices b50, the non-IOV device b53, and other input/output (IO) devices are devices for executing input/output (IO) processing. Examples of the IO devices include a network IO device for holding a network communication, a storage IO device for operating storage, and a graphic IO device for outputting to a display. Those IO devices are connected (coupled) to a display b56, a network b55, external storage b54, and other types of equipment. Types of equipment to which the IOV devices b50, the non-IOV device b53, and other input/output (IO) devices are connected (coupled) do not need to be limited to the combination of a display, a network, and external storage, and the IO devices may not be connected (coupled) to some of the types of equipment in the combination or may be connected (coupled) to a plurality of pieces of equipment of the same type. For instance, a plurality of IO devices may be coupled to a network whereas no IO device is connected to a display.

The IOV devices b50 which are physical IO devices with a sharing function as that of an SR-IOV device each include at least one Physical Function (PF) b51 and at least one Virtual Function (VF) b52. The PF (b51) and the VF (b52) are each a function block capable of IO processing as an IO device. The PF (b51) has functions for managing a plurality of VFs (b52), for example, a function of changing the VF counts in the IOV devices b50 and a function of changing VF settings. The PF (b51) and the VF (b52) may be circuits packaged in the IOV devices, or may be implemented by software programs in the IOV devices.

Each VF b52 is always associated with one PF b51. When the PF 51 is reset, its associated VF b52 is reset simultaneously. Resetting the PF b51 does not cause a reset of the VF b52 that is not associated with the reset PF b51. The PF b51 in some type of IOV device b50 is also capable of controlling the VF b52. The non-IOV device b53 represents a device that is not compliant with IOV or a normal IO device which is not used as an IOV device. The physical computer b1 may have a plurality of IOV devices b50 as in FIG. 1, or may have only one IOV device b50. The physical computer b1 may have a plurality of non-IOV devices b53, or may not have any non-IOV device b53.

The non-IOV device b53 is operated by only one user virtual machine b310 or one management virtual machine b320 at each point in time. For example, in the case where a network is coupled to the non-IOV device b53, only one user virtual machine b310 or one management virtual machine b320 is coupled to the network on the display. In each of the IOV devices b50, each PF (b51) is operated by only one user virtual machine b310 or one management virtual machine b320, and the same applies to each VF (b52) in the IOV device. One VF and another VF in this configuration may be operated by different user virtual machines b310 or different management virtual machines b320. Accordingly, in the case where one of the IOV devices b50 is coupled to a network, for example, a plurality of management virtual machines b320 and a plurality of user virtual machines b310 can hold network communications concurrently.

The user virtual machine b310 or the management virtual machine b320 inputs/outputs by issuing an IO request to the non-IOV device b53, the PF (b51), or the VF (b52) that is operated by the user virtual machine b310 or the management virtual machine b320 itself. The user virtual machine b310 or the management virtual machine b320 does not issue an IO request directly to the non-IOV device b53, the PF (b51), or the VF (b52) and causes the physical CPU (b2) to execute a command program instead. The address of the non-IOV device b53, the PF (b51), or the VF (b52) is written in the command program, and the physical CPU (b2) attempts to access this address. The address protection mechanism b6 interprets the address and, in the case of the non-IOV device b53, the PF (b51), or the VF (b52) that the user virtual machine b310 or the management virtual machine b320 can operate, the access is forwarded to the root bridge (b40). This procedure is described later with reference to FIG. 14. Receiving the forwarded access, the root bridge (b40) operates the relevant non-IOV device b53, PF (b51), or VF (b52). This procedure is described later with reference to FIG. 11.

An in-flight operation list b41 is in the root bridge b40 to record pending IO processing that involves a device.

The console b7 is connected to the root bridge (b40) to provide an interface that allows a system administrator, a user, or other people to activate the hypervisor and apply a set value to a VF. Physical computers in general are equipped with external output equipment, typically a console as this console b7.

The configuration of FIG. 1 is a representative configuration, but a different configuration which uses different component names or different blocks may be employed as long as the employed configuration has those functions. An IO subsystem constituted of the address protection mechanism b6 and the root bridge (b40) is described first. There are standards for the IO subsystem such as PCI and USB. The IO subsystem does not always need to be limited to standardized specifications. The physical CPU, the user virtual machine, the management virtual machine, the VF driver in the user virtual machine, or the PF driver in the management virtual machine can issue IO requests via the IO subsystem.

Figure 14:
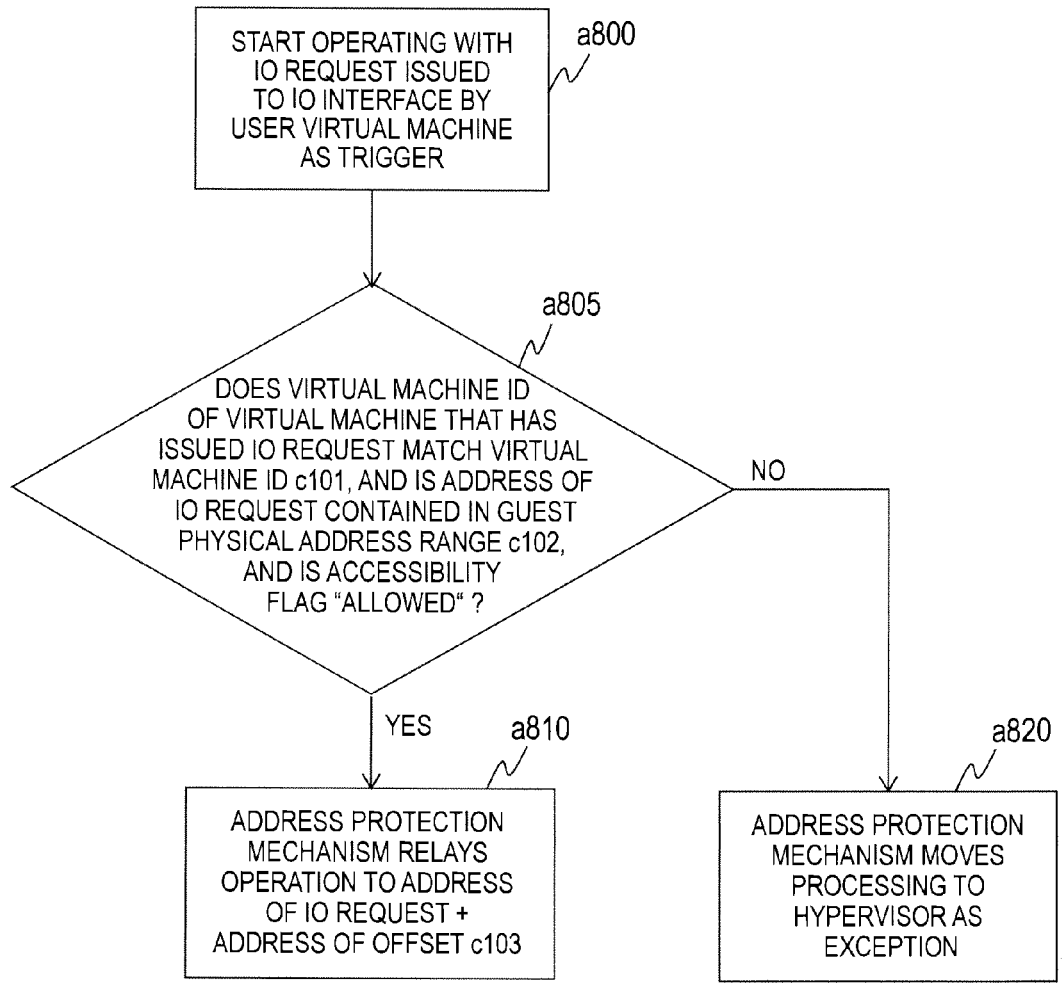
FIG. 14 is a flow chart of the operation of the address protection mechanism.
Figure 15:
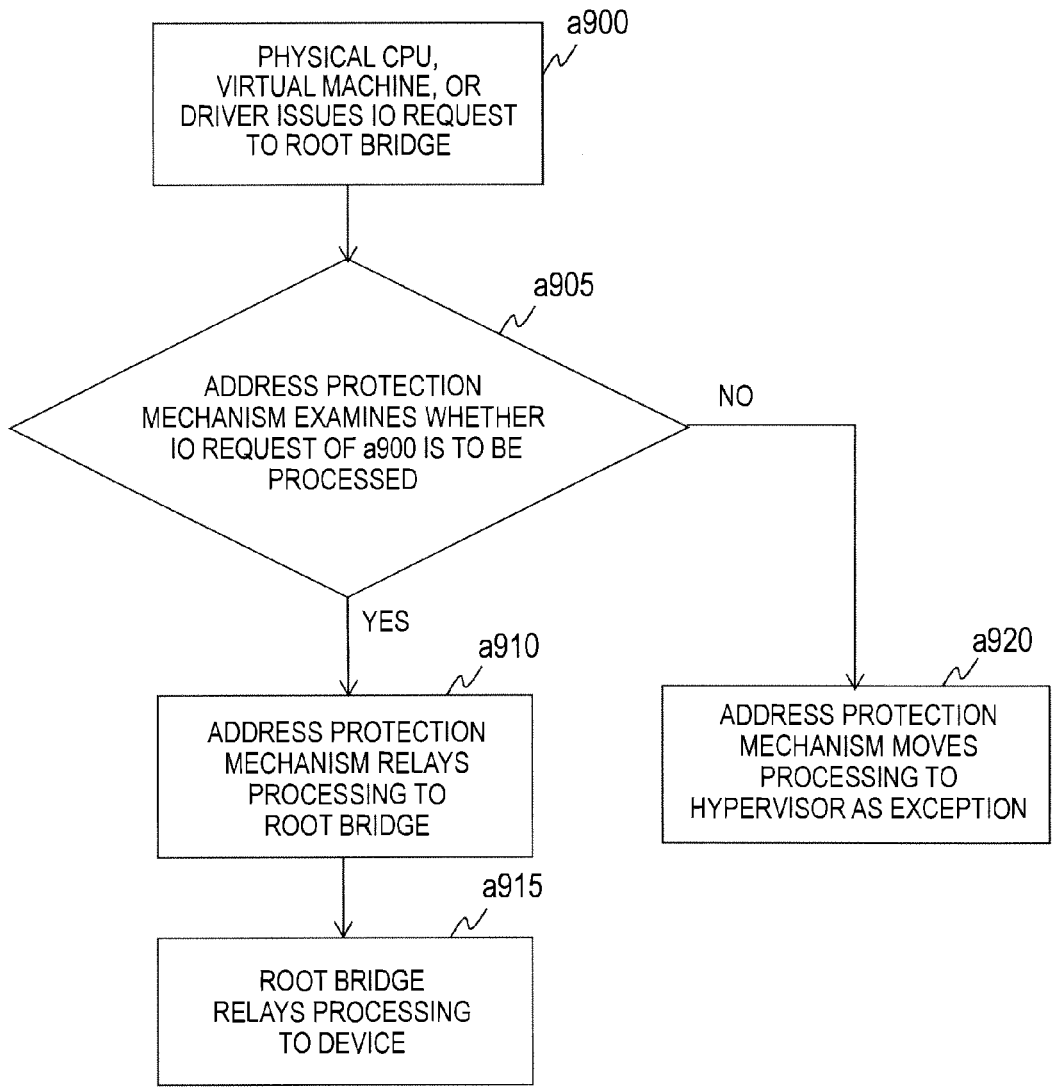
FIG. 15 is a flow chart of the operation of an IO subsystem of the root bridge which connects a CPU and an IO device.

An outline of IO request processing in the IO subsystem is given with reference to FIG. 15. The physical CPU (b2), one of the virtual machines such as the user virtual machine b310 or the management virtual machine b320, or one of the drivers such as the VF driver b313 in the user virtual machine or the PF driver b323 in the management virtual machine first issues an IO request by transmitting an electrical signal compliant with standards of the IO subsystem to the root bridge (b40) (a900). This IO request is processed by the address protection mechanism b6 first (a905). The processing proceeds to a step a910 in the case where the address protection mechanism b6 determines that the IO request is to be processed, and to a step a920 in the case where the address protection mechanism b6 determines that the IO processing is not to be processed. Details of this procedure are described later with reference to FIG. 14.

In the step a910, the address protection mechanism b6 relays the IO request to the root bridge (b40), which, in the following step a915, further relays the IO request to a device such as one of the IOV devices b50 or the non-IOV device b53. In the step a920, the address protection mechanism b6 does not relay the IO request to the root bridge (b40).

An example of an address protection table b61 which is held by the address protection mechanism b6 is described next with reference to FIG. 5. Components of the address protection table b61 include, for example, a user virtual machine ID c101, which indicates an identifier assigned to each user virtual machine b310 to identify the user virtual machine b310, a guest physical address range c102, which means the physical address of the relevant PF (b51) or VF (b52) that is viewed from the user virtual machine b310, an offset c103, which means a differential between the physical address of the PF (b51) or the VF (b52) that is viewed from the user virtual machine b310 and the physical address of the PF (b51) or the VF (b52) that is viewed from the physical computer, and an accessibility flag c104, which is used to determine whether the user virtual machine b310 is allowed to access the guest physical address range in question. The address protection table b61 can be set by the hypervisor (b330), which controls IO requests from virtual machines.

How the address protection mechanism b6 operates is described with reference to FIG. 14. The address protection mechanism b6 starts its operation with the issuance of an IO request by the user virtual machine b310 to the root bridge (b40) as a trigger (a step a800). In response to the IO request issued by the user virtual machine b310, the address protection mechanism b6 refers to the address protection table b61 to check (1) the virtual machine ID of the sender of the IQ request and (2) an address included in the IO request, and examines whether the table has a line where the virtual machine ID (1) of the sender of the IO request matches the user virtual machine ID c101 and the address (2) of the IO request is contained in the guest physical address range c102 (a805). In the case where a line that meets the criteria is found in a805 and the accessibility flag of the line is "allowed", a step a810 is executed. Otherwise, a step a820 is executed.

In the example of FIG. 5, cases where the address protection mechanism b6 proceeds to a810 are, for instance, one in which the user virtual machine ID is 1 and the address of the IO request is 0x020000 (included in Line 1), one in which the user virtual machine ID is 1 and the address of the IO request is 0x407000 (included in Line 2), and one in which the user virtual machine ID is 2 and the address of the IO request is 0x010000 (included in Line 4). On the other hand, cases where the address protection mechanism b6 proceeds to a820 are, for instance, one in which the user virtual machine ID is 1 and the address of the IO request is 0x800000 (no line meets the criteria), one in which the user virtual machine ID is 3 (no line meets the criteria), and one in which the user virtual machine ID is 1 and the address of the IO request is 0x600000 (included in Line 3 but the accessibility flag is "denied").

The step a810 is described. The address protection mechanism b6 accesses an address that is calculated by adding the offset c103 to the address of the IO request. The address protection mechanism b6 consequently accesses an IO device whose address range contains the calculated address. For example, when the user virtual machine ID is 1 and the address of the IO request is 0x020000 (included in Line 1), the offset c103 in Line 1 is 0x100000 and the address protection mechanism b6 therefore accesses 0x120000. To give another example, when the user virtual machine ID is 1 and the address of the IO request is 0x407000 (included in Line 2), the offset c103 in Line 2 is −0x100000 and the address protection mechanism b6 therefore accesses 0x307000. To give still another example, when the user virtual machine ID is 2 and the address of the IO request is 0x010000 (included in Line 4), the offset c103 in Line 4 is 0x200000 and the address protection mechanism b6 therefore accesses 0x210000.

The operation in a820 is described. In the case where no line that meets the criteria is found in the step a805, or the accessibility flag is "denied" in the found line, the address protection mechanism b6 sends an exceptional interrupt to the hypervisor (b330). The hypervisor (b330) is thus informed of the fact that the virtual machine has issued an invalid IO request. Sending the interrupt may be replaced by an inquiry regularly made by the hypervisor (b330) to the address protection mechanism b6, depending on how the hypervisor (b330) and the address protection mechanism b6 are packaged, and it is also acceptable to do nothing in the case where the hypervisor (b330) does not need to know of invalid IO requests.

The VF allocation table b332 illustrated in FIG. 6 is described next. The VF allocation table b332 includes, for example, a PF identification number c201, which is an identifier assigned to each PF (b51) to identify the PF (b51), a VF identification number c202, which is an identifier assigned to each VF (b52) to identify the VF (b52), a user virtual machine ID c203, which is an identifier assigned to each user virtual machine b310 to identify the user virtual machine b310, a guest physical address range c204, which means an address where the user virtual machine b310 operates the VF (b52) that is identified by the PF identification number c201 and the VF identification number c202, and a waiting time c205, which means the maximum length of time necessary for the VF (b52) that is identified by the PF identification number c201 and the VF identification number c202 to process an IO request. The combination of a PF identification number and a VF identification number is unique without fail. In other words, the VF allocation table b332 is configured so that no more than one line has a combination of, for example, a PF identification number "1" and a VF identification number "1".

The VF allocation table b332 can be set by the hypervisor (b330). The hypervisor (b330) uses the VF allocation table b332 to manage relations of the PFs (b51) and the VFs (b52). For example, according to this table, the PF (b51) whose PF identification number is 1 and the VF (b52) whose VF identification number is 2 are allocated to the user virtual machine b310 whose user virtual machine ID is 1, and the user virtual machine b310 whose user virtual machine ID is 1 issues an IO request to this VF (b52) using an address from 0x010000 to 0x03ffff.

In this embodiment, the error handling module b331 stops access by the VF driver b313, and then confirms that every IO processing procedure of the VF driver b313 has been completed. To describe this processing, the behavior of the root bridge (b40) in PCI is described first.

The root bridge (b40) roughly has three operations. Details of each of the operations are described next.

(1) When the user virtual machine b310, the management virtual machine b320, or the hypervisor (b330) issues a device IO processing request, the root bridge (b40) stores a history in the in-flight operation list b41, which is inside the root bridge (b40), and then transmits a processing request of IO processing, along with an operation ID, to the relevant IO device such as one of the by devices b50 or the non-IOV device b53.

An example of the data configuration of the in-flight operation list b41 is described with reference to FIG. 18. The in-flight operation list b41 is a two-dimensional table that includes, for example, an operation ID (c401) for uniquely identifying an operation, an operator (c402) for identifying a subject that has executed the operation, and an access time (c403) indicating a time when the operation has been executed. A subject that executes an operation can be, for example, the user virtual machine b310, the management virtual machine b320, or the hypervisor (b330).

Figure 19:
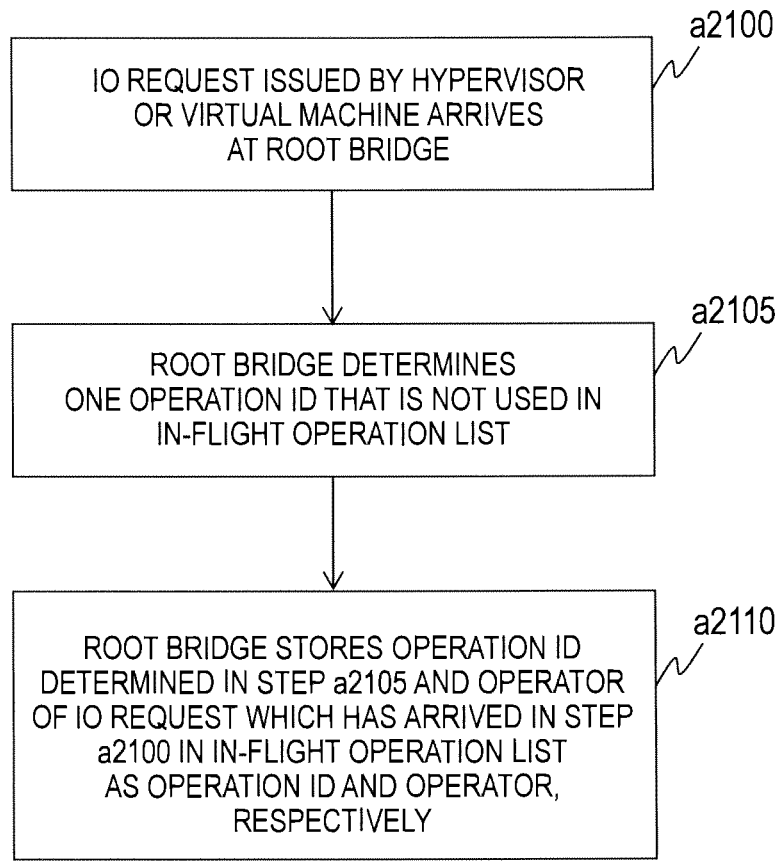
FIG. 19 is a flow chart illustrating an operation of the root bridge that is executed when an IO request is received.

A procedure executed by the root bridge (b40) to store a history in the in-flight operation list b41 is described with reference to FIG. 19. The procedure of FIG. 19 is started when an IO request issued by the hypervisor (b330) or one of the virtual machines arrives at the root bridge (b40) (a2100). In the following step a2105, the root bridge (b40) determines, as a unique ID, an operation ID that is not used in the in-flight operation list b41. The root bridge (b40) then stores the operation ID determined in the step a2105, the operator of the IO request that has arrived in the step a2100, and the time of the arrival in the in-flight operation list b41 as the operation ID c401, the operator c402, and the access time c403, respectively (a step a2110).

The operation ID used in this procedure is also transmitted to the relevant IO device and, in the next procedure, the IO device returns a response along with the operation ID.

(2) When a response to the above-mentioned device IO processing request is returned by the device along with the operation ID, the root bridge (b40) relays the response to the user virtual machine b310, the management virtual machine b320, or the hypervisor b330. At this point, the root bridge (b40) searches the in-flight operation list b41 for IO processing that is associated with the response, and deletes the IO processing.

To give a more detailed description, the root bridge (b40) reads a line out of the in-flight operation list b41 that has a matching operation ID, relays the response to an operator recorded in this line, and deletes this line at the same time the response is relayed.

Figure 11:
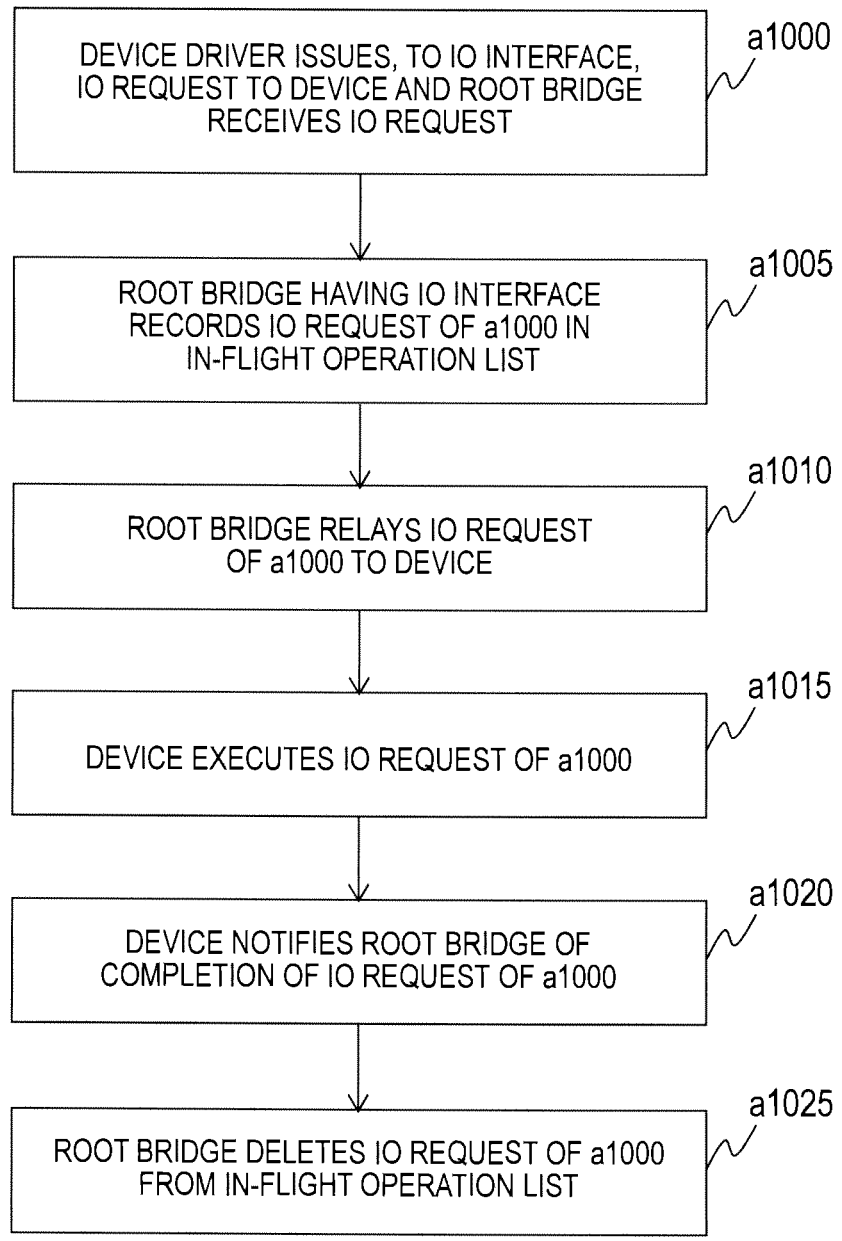
FIG. 11 is a flow chart of how a root bridge operates in the case where an error has not occurred in a device.

The operations (1) and (2) of the root bridge (b40) are, for example, as illustrated in FIG. 11. First, an IO request issued by a device driver to a device is received by the root bridge (b40) (a step a1000). The root bridge (b40) determines whether or not this IO request is for a type of operation that is recorded in the in-flight operation list b41. In the case of an operation to be recorded in the in-flight operation list b41, the root bridge (b40) records this IO request in the in-flight operation list b41 (a step a1005). The root bridge (b40) then relays the IO request to the device (a step a1010). The device processes the IO request relayed in the step a1010 (a step a1015) and, when completing the processing of the IO request, notifies the root bridge (b40) of the completion (a step a1020). When notified of the completion, the root bridge (b40) deletes the IO request recorded in a1005 from the in-flight operation list b41 (a1025).

(3) In the case where there is IO processing that is yet to be deleted after a given period of time passes since the access time, on the other hand, the root bridge (b40) determines that an error has occurred in the device and shuts down the physical computer for safety. An error in a device can continuously damage various types of data stored in the main memory, the external storage, and the like, and the root bridge (b40) shuts down the physical computer in order to prevent the damage.

Through this operation, an error in a device can be detected and used as a trigger for shutting down the physical computer. The validity of this error detection as a trigger for shutting down the physical computer is described with reference to FIG. 12.

Figure 12:
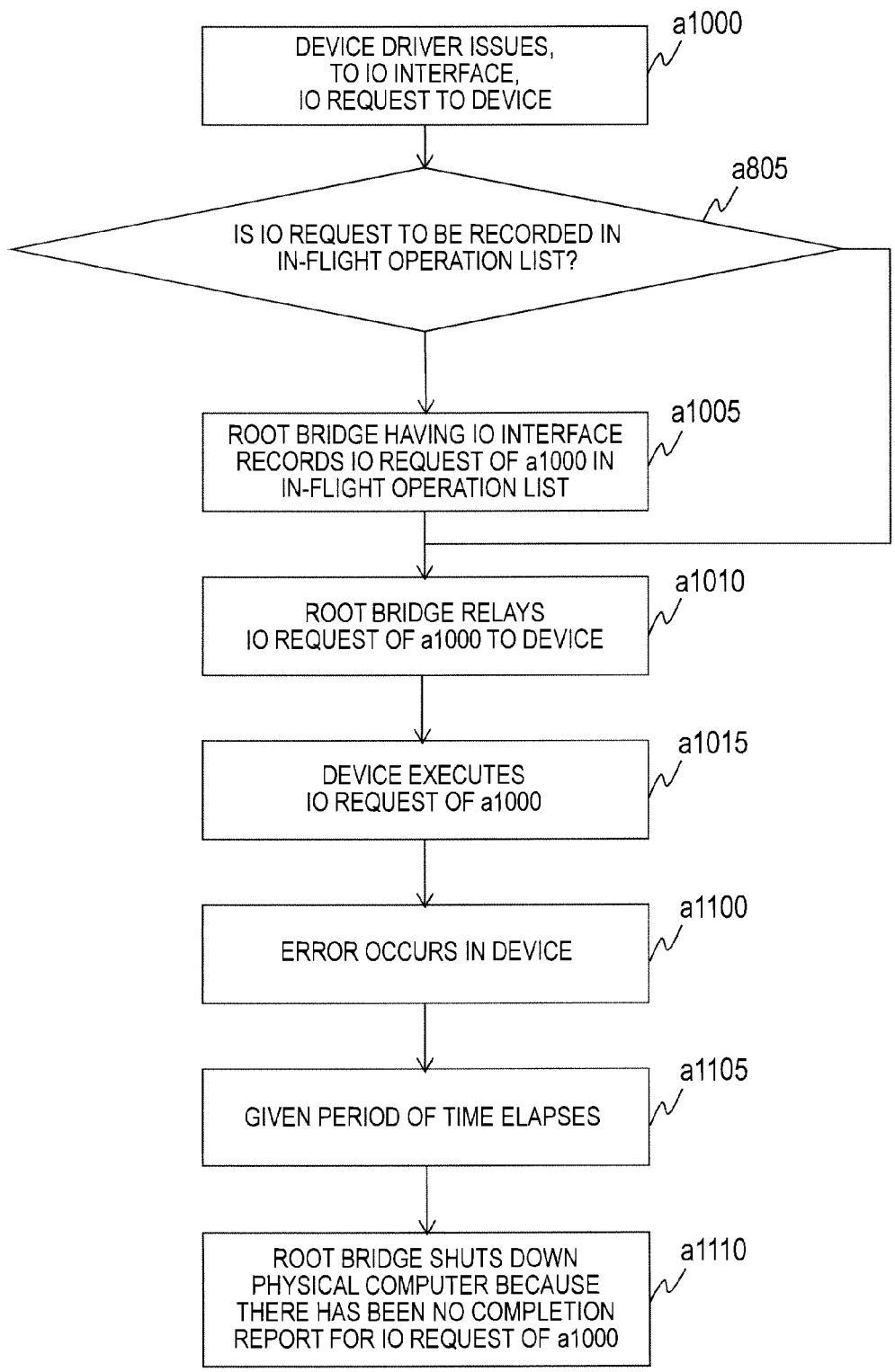
FIG. 12 is a flow chart of how the root bridge operates in the case where an error has occurred in a device.

FIG. 12 is a flow chart illustrating how the root bridge (b40) operates when an error occurs in a device while the device is processing an IO request (during the step a1015). The steps a1000, a1005, a1010, and a1015 of FIG. 12 are not different from those of FIG. 11, and descriptions thereof are omitted here.

In the case where an error occurs in the step a1100, a given period of time passes (a step a1105) without the completion report which is made to the root bridge (b40) in FIG. 11 (the step a1020 of FIG. 11) being submitted. Consequently, the completion of the processing is not recorded in the in-flight operation list b41, and the root bridge (b40) determines that there is no completion report and shuts down the physical computer in a step a1110.

Although FIG. 12 deals with a case where an error occurs in a device while the device is processing an IO request (during the step a1015), the root bridge (b40) operates the same way when an error occurs before an IO request is issued, because, in this case, too, a given period of time passes (the step a1105) without the completion report which is made to the root bridge (b40) (the step a1020 of FIG. 11) in FIG. 11 being submitted. The root bridge (b40) can thus detect an error in an IO device and can stop damage from the IO device to the physical computer (the rewriting of the main memory contents, the spreading of the error to other devices, and the execution of an unauthorized program).

Figure 13:
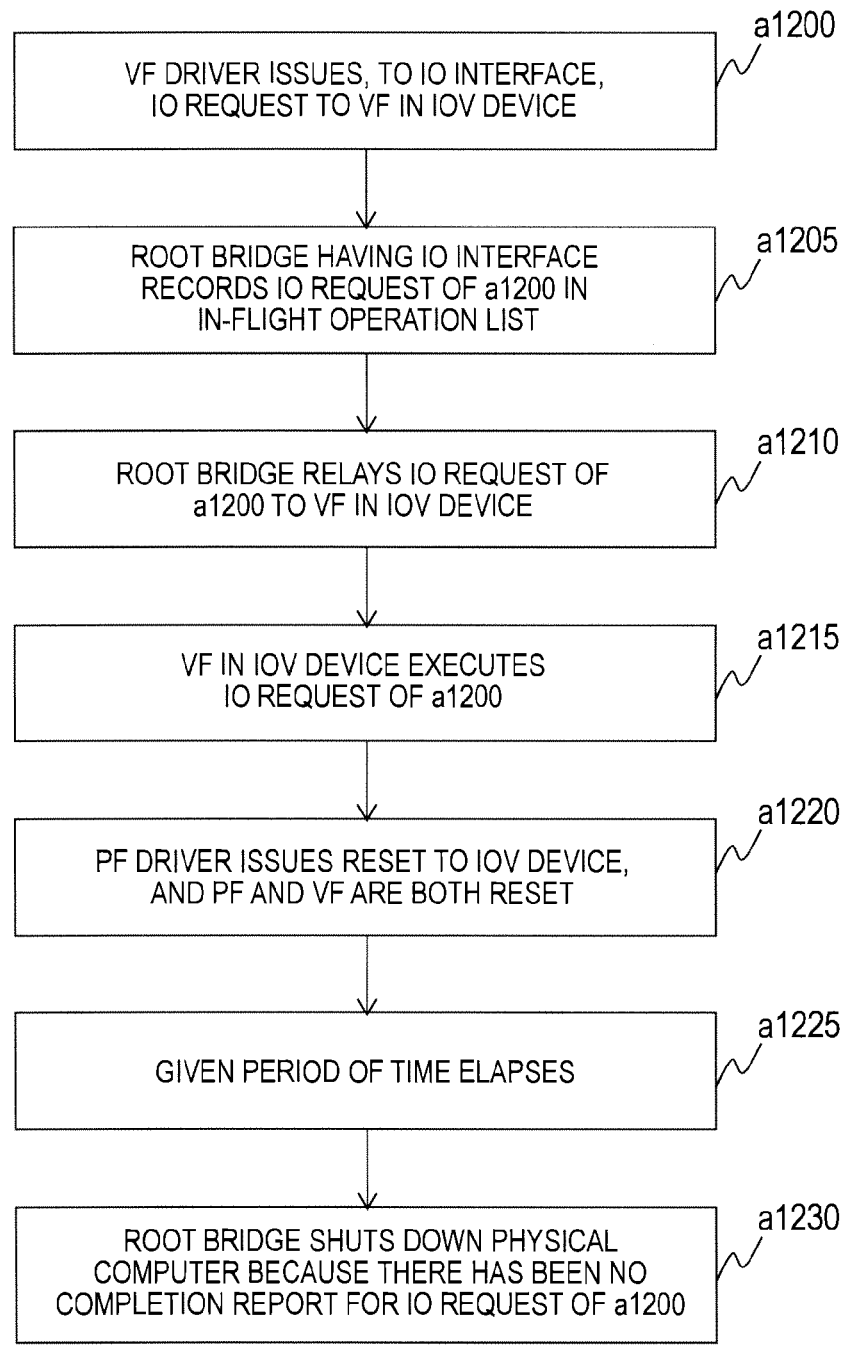
FIG. 13 is a flow chart of how the root bridge operates in the case where a PF is reset immediately after an IO request is issued to a VF.

A description is given next with reference to FIG. 13 of how the root bridge (b40) behaves in the case where the PF driver b323 executes a PF reset immediately after the VF driver b313 in one of the IOV devices b50 executes IO processing. Described here is the behavior of the root bridge (b40) that is observed when the VF driver b313 performs IO processing on the associated VF (b52) and the PF driver b323 resets the associated PF (b51) before the device returns a response. When the VF driver b313 performs IO processing on the VF (b52), the device IO processing request of (1) is issued, leaving a history in the in-flight operation list b41 which is held inside the root bridge (b40). At this point, when the PF (b51) is reset before the device sends a response, the VF (b52) is reset as well and the device's response of (2) is therefore never returned. The root bridge (b40) accordingly makes the error determination of (3) after a given period of time, and shuts down the physical computer.

Steps a1200, a1205, a1210, and a1215 of FIG. 13 are substantially the same as a1000, a1005, a1010, and a1015 of FIGS. 11 and 12, except that an IO request is made to the VF (b52) in one of the IOV devices b50, and are described anew.

In the step a1200, the VF driver b313 makes an IO request to the VF (b52) in the IOV device b50 by issuing an IO request to the root bridge (b40). When receiving the IO request, the root bridge (b40) records in the in-flight operation list b41 (the step a1205). In the following step a1210, the root bridge (b40) relays the IO request to the VF (b52) in the IOV device b50.

The VF (b52) in the IOV device b50 executes the IO request relayed in a1210 (a1215). While the IO request is being executed, the PF driver b323 issues a reset to the IOV device b50 (a1220), and the PF (b51) and the VF (b52) are both reset. The reset is accompanied by the discarding of the IO request of a1200 which has been in the middle of being processed by the VF (b52). Then, as in FIG. 12 where an error occurs in the device (the step a1105 of FIG. 12), a given period of time passes (a1225), and the root bridge (b40) shuts down the physical computer on the ground that no completion report has been received for the IO request of a1200 from the VF (a1230).

Although the physical computer is shut down in FIG. 13, there is actually no device error and accordingly no damage to the physical computer (the rewriting of the main memory contents, the spreading of the error to other devices, and the execution of an unauthorized program). Shutting down the physical computer is therefore unnecessary in actuality.

To prevent this shutdown in this embodiment, the error handling module b331 stops subsequent access by the VF driver b313, then confirms that every IO processing procedure of the VF driver b313 has been completed, and lastly resets the IOV device b50. This procedure is described with reference to FIG. 2.

Figure 2:
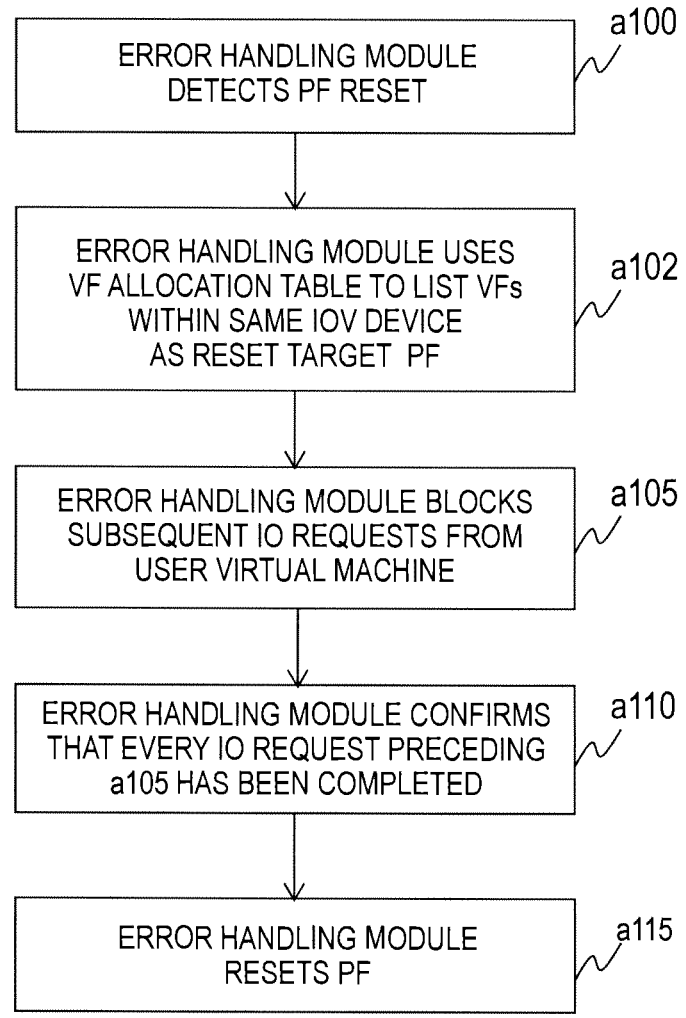
FIG. 2 is a flow chart illustrating an example of the outline of processing that is executed by an error handling module.

FIG. 2 is an example of a flow chart illustrating the procedure that is executed by the error handling module b331. The shutdown of the physical computer can be prevented by completing a response to every IO request made by the VF driver b313 at the time of reset issued by the PF driver b323. The error handling module b331 therefore detects a reset issued by the PF driver b323 and starts operating with the detection as a trigger (a step a100). This procedure can be accomplished by several methods. Typically, the accessibility to an address where the reset takes place is set to "denied" in the address protection table b61 and, when this address is accessed, the hypervisor executes processing. An address where a reset takes place is defined in the standards of the IO subsystem in most cases, and the hypervisor (b330) can therefore detect a reset without using software that has specifications unique to the device, such as the PF driver or the VF driver. However, in the case where reset specifications unique to the device are known to the hypervisor (b330), the hypervisor (b330) may detect a reset unique to the device. After this detection, the error handling module b331 uses the VF allocation table b332 to list the VFs (b52) that are within the same IOV device as the reset target PF (b51) (a step a102). Specifically, the error handling module b331 selects from the VF allocation table b332 of FIG. 6 every line where the PF identification number c201 matches the identification number of the reset target PF (b51), and records all VF identification numbers c202 of those selected lines. The VFs (b52) listed by this procedure when, for example, the VF allocation table b332 is as illustrated in FIG. 6 and the reset target PF (b51) of the step a100 has a PF identification number "1" are the VF (b52) that has a VF identification number "1" and the VF (b52) that has a VF identification number "2". The VFs listed when the reset target PF of the step a100 has a PF identification number "2" are the VF that has a VF identification number "3" and a VF that has a VF identification number "4".

After the step a102 is completed, the error handling module b331 suspends subsequent IO requests made by the VF driver b313 (a step a105). The error handling module b331 next confirms that a response has been completed for every IO request that has been made prior to the suspension of IO requests in the step a105 (a step a110). The hypervisor (b330) then resets the PF (b51) anew (a step a115). The reset procedure which is defined in the standards of the IO subsystem in most cases can be executed without the participation of the PF driver b323 or the VF driver b313. However, in the case where reset specifications unique to the device are known to the hypervisor (b330), a reset unique to the device may be issued. The hypervisor (b330) may also request the management virtual machine to issue a reset anew. In this case, the hypervisor (b330) grants the reset by rewriting the address protection table b61 or other methods.

It is important to execute the step a105, the step a110, and the step a115 in the order stated. If the step a110 is omitted, for example, it means that IO requests made by the VF driver b313 are pending, and issuing the reset of a115 while the IO requests are pending leads to the shutdown of the physical computer. Executing those steps in the order stated is therefore the key to obtaining the effects of this invention.

Figure 3:
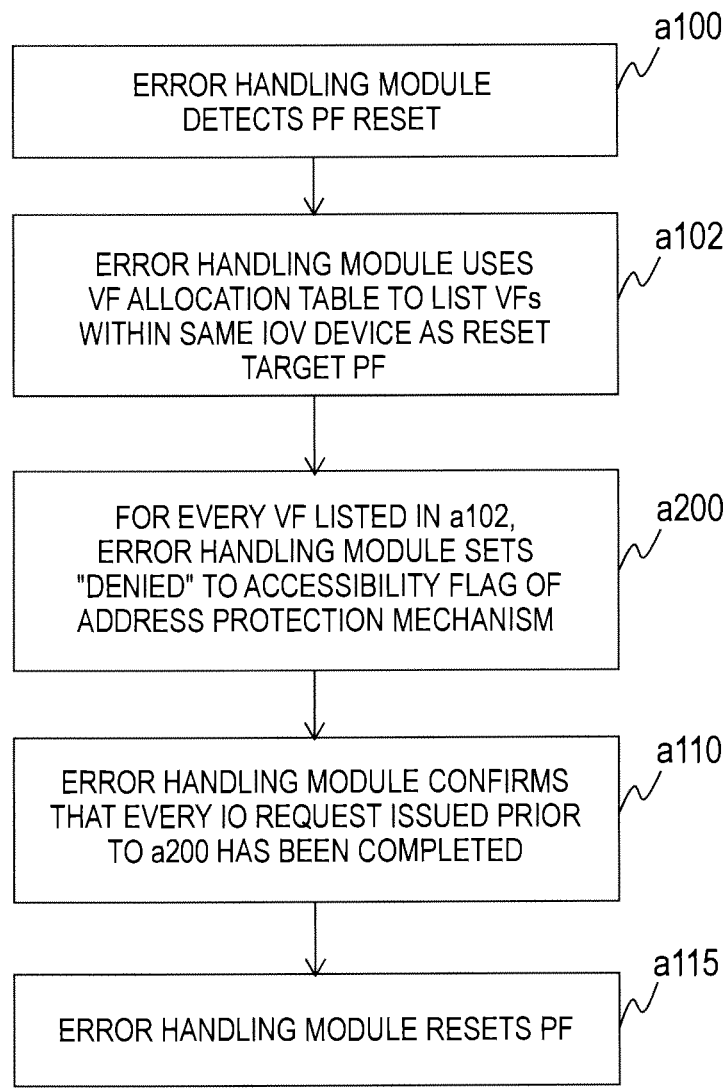
FIG. 3 is a flow chart for a procedure of setting an address protection mechanism which is executed by the error handling module to block IO processing of a VF.

This embodiment further discusses details of the step a105 of FIG. 2 with reference to FIG. 3. FIG. 3 is an example of using the address protection mechanism b6 for the step a105 in which subsequent IO requests made by the VF driver b313 are suspended. FIG. 3 differs from FIG. 2 only in that a step a200 replaces the step a105, and the step a200 alone is therefore described.

For each VF (b52) listed in the step a102, the guest physical address range c102 in the address protection mechanism b6 is obtained based on the guest physical address range c204 in the VF allocation table of FIG. 6. The VF allocation table of FIG. 6 is referred to in obtaining the guest physical address range c102. For example, in the case where one of the listed VFs (b52) has a VF identification number "1", the guest physical address range of this VF is 0x010000 to 0x03ffff. Based on a guest physical address range that corresponds to this guest physical address range and the fact that the VF (b52) having a VF identification number "1" is allocated to the user virtual machine 310 having a user virtual machine ID "1", it is determined that Line 1 of the table inside the address protection mechanism b6 meets the criteria. In this case, subsequent IO requests made by the VF driver b313 are suspended by setting the accessibility flag c104 to "denied" in Line 1 of the table in the address protection mechanism b6 which is illustrated in FIG. 5. Blocking subsequent IO requests in this manner and thus preventing the VFs (b52) from newly receiving IO requests minimizes the time required for the confirmation of a110, and allows the proper start of completion confirmation that is described later with reference to FIGS. 4 and 20 and that uses IO requests having a guaranteed order of completion.

There are roughly two different methods of denying access with the use of the accessibility flag. In the case where the address protection mechanism b6 has a function of denying access to the address in question, this function is enabled. This case requires simply setting the accessibility flag to "denied". In other cases, the accessibility flag is set so that an address that has undergone an address conversion becomes an invalid address. For example, when addresses used by the physical computer are 0x0 to 0xafffffff, addresses "0xb0000000" to "0xffffffff" are invalid, and converting an address into one of those addresses substantially invalidates the access. By controlling/changing the address protection mechanism b6 and addresses that are managed by the address protection mechanism b6 in this manner, IO requests are prevented from arriving at the root bridge (b40), which manages the completion/incompletion of IO requests.

After the step a200, an interrupt may be virtually sent to the virtual CPU b311 to inform the user virtual machine b310 of the fact that the VFs have become unavailable for use. For example, in the case where the OS b314 has set an interrupt number to the root bridge (b40), the OS b314 is notified by sending a virtual interrupt to the virtual CPU b311 with the use of the interrupt number. Alternatively, an interrupt number originated from the system may be used for the notification, or no particular actions may be taken to notify the OS in the case where the OS recognizes automatically. Through those procedures, subsequent IO requests made by the VF driver b313 are suspended.

Figure 4:
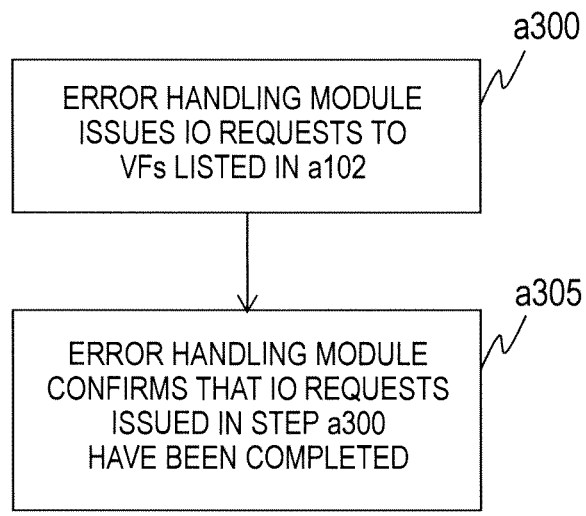
FIG. 4 is a flow chart of dummy access made by the error handling module to confirm the completion of IO processing of a VF.

A concrete procedure of the step a110 in which the completion of IO processing of the VF driver b313 is confirmed is described with reference to FIG. 4. FIG. 4 is the same as FIG. 2 except that steps a300 and a305 replace the step a110 of FIG. 2. The steps a300 and a305 alone are therefore described.

Before describing those steps, IO requests that have a guaranteed order of completion are described. IO requests having a guaranteed order of completion are, for example, non-posted requests such as read/write requests to the PCI configuration space of a PCI-compatible protocol (PCI/PCI-X/PCI Express) and read requests to memory-mapped I/O, and have a feature of being completed in the order that the requests are executed. In the case where those non-posted requests are used as IO requests and the requests are waited to be completed, it is guaranteed that every non-posted request made prior to the IO requests has been completed. A concrete example thereof is described with reference to FIG. 20.

Figure 20:
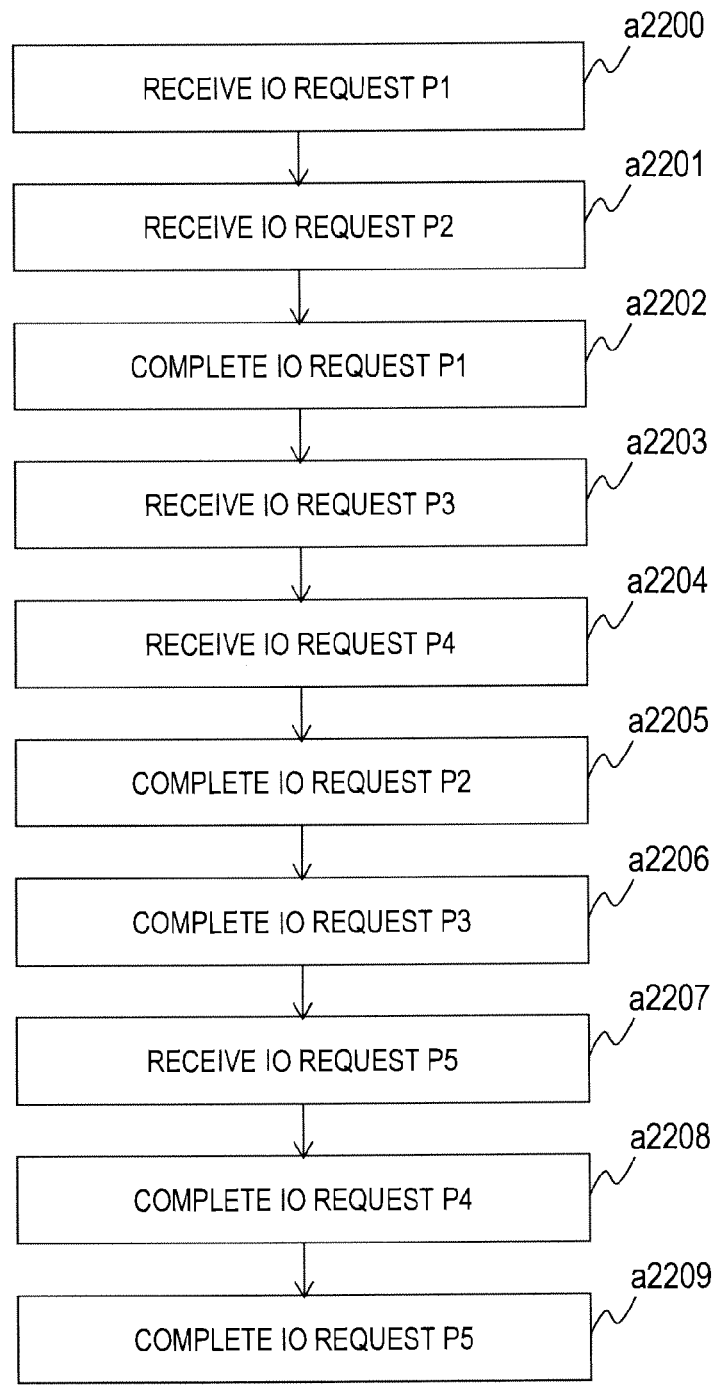
FIG. 20 is a flow chart how a VF receives IO requests and completes the processing of the IO requests when the order of completing IO requests is guaranteed.

FIG. 20 illustrates an example of a flow along which IO requests that have a guaranteed order of completion as the ones described above are received at one VF (b52) and the processing of the IO requests is completed at the VF (b52). The premise of this example is that an IO request P1, an IO request P2, an IO request P3, an IO request P4, and an IO request P5 are issued in the order stated from the VF driver b313, the hypervisor (b330), or the like. The VF (b52) first receives the IO request P1 in a step a2200. The VF (b52) next receives the IO request P2 in a step a2201. In a step a2202, the VF (b52) processes the IO request P1 received in the step a2200 and finishes processing the IO request P1. The VF (b52) next receives the IO request P3 in a step a2203. The VF (b52) next receives the IO request P4 in a step a2204. In a step a2205, the VF (b52) processes the IO request P2 received in the step a2201 and finishes processing the IO request P2. In a step a2206, the VF (b52) processes the IO request P3 received in the step a2203 and finishes processing the IO request P3. The VF (b52) next receives the IO request P5 in a step a2207. In a step a2208, the VF (b52) processes the IO request P4 received in the step a2204 and finishes processing the IO request P4. In a step a2209, the VF (b52) processes the request P5 received in the step a2207 and finishes processing the IO request P5.

Thus, while the VF (b52) does not need to wait for the completion of one IO request to receive the next IO request, the order in which the IO requests are completed is the same as the order of reception, specifically, P1, P2, P3, P4, and then P5.

Using IO requests that have a guaranteed order of completion thus means that, once the completion of, for example, the IO request P5 is observed, the IO requests P1, P2, P3, and P4 which have been issued prior to P5 are guaranteed to be completed.

Referring back to FIG. 4, a description is given of the steps 300 and 305, which are procedures where those IO requests having a guaranteed order of completion are used. After the step a105 of FIG. 2 is completed, the error handling module b331 issues IO requests that have a guaranteed order of completion as those described above to the respective VFs (the step a300). The error handling module b331 then confirms the completion of the IO requests of a300 (the step a305), to thereby confirm the completion of all non-posted IO requests that have been received by the VFs listed in a102 prior to the issuance of the IO requests of a300. For example, in the case where PCI configuration read which is one of non-posted requests in PCI is used as an IO request of a300, it can be determined that non-posted IO requests issued prior to a300 have been completed when the hypervisor (b330) finishes reading the value. In the case of PCI, for example, a request that is not a non-posted request (a posted request) has a feature of not being stored in the in-flight operation list b41, and therefore does not lead to the shutdown of the physical computer even if not completed.

For example, in the case where the VF (b52) listed in a102 has received the IO requests P1, P2, P3, and P4 issued before the error handling module b331 of the hypervisor (b330) has set the accessibility flag to "denied" in the step a200 of FIG. 3, the error handling module b331 issues the IO request P5 to this VF in the step a300, and the error handling module b331 confirms in the step a305 that the IO request P5 of a2209 has been processed, thereby confirming that the VF has completed the processing of the IO requests P1, P2, P3, and P4 issued before the accessibility flag has been set to "denied" in a200.

With the configurations and operations of a physical computer, virtual machines, and virtual machine system according to the first embodiment, the physical computer where a plurality of virtual machines sharing an I/O device run is prevented from shutting down when pending IO processing that originates from a VF remains. In addition, by listing only VFs that are associated with a PF for which a reset has been issued in the step a102, issuing IO requests to only the listed VFs in the steps a300 and a305, and confirming the completion of the requests, the system can selectively stop only VFs that are affected by the reset, while avoiding stopping IOV devices that do not need to be stopped and devices that are not compliant with IOV. Further, the computing machine in this embodiment can be realized with, for example, an IOV device that conforms to SR-IOV standards and a driver of the IOV device.

Second Embodiment

Figure 7:
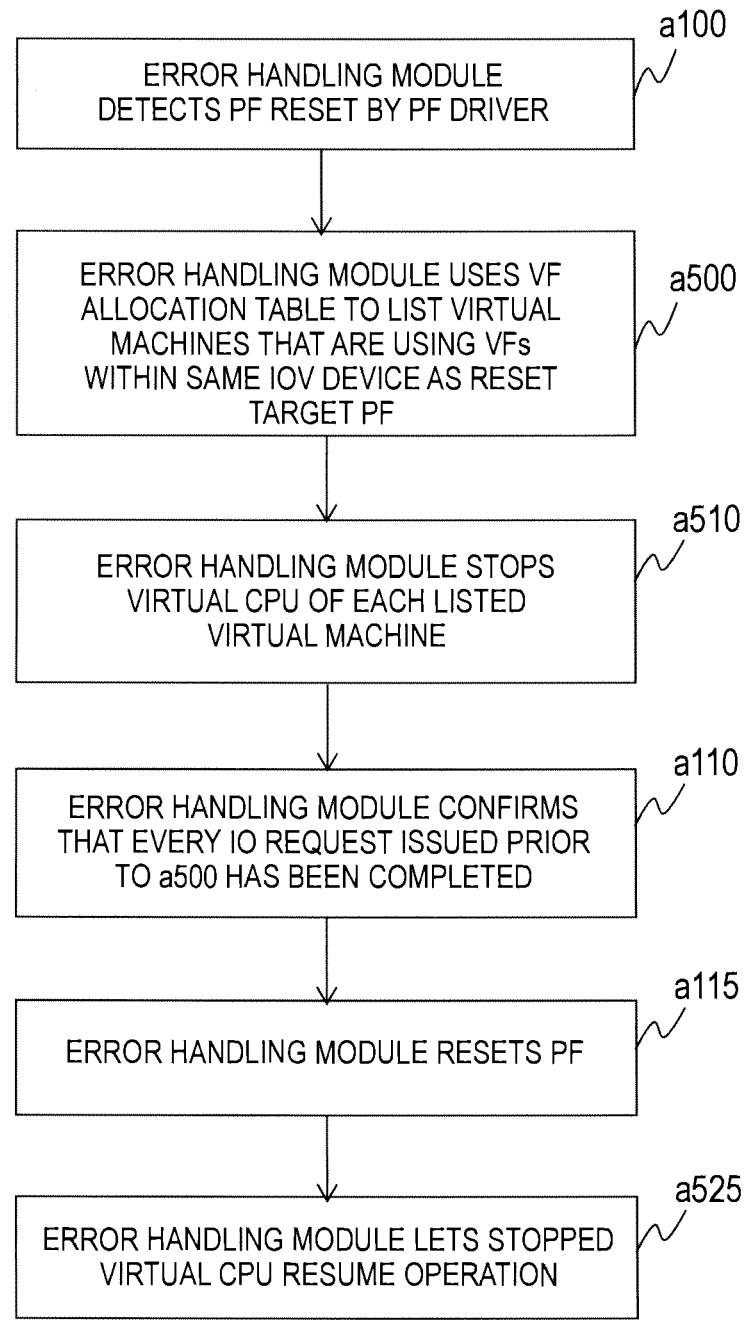
FIG. 7 is a flow chart for a procedure of stopping a virtual CPU which is executed by the error handling module to block IO processing of a VF.

A second embodiment of this invention describes, with reference to FIG. 7, a method of accomplishing the steps a102 and a105 of FIG. 2 that is different from the one in the first embodiment. Before describing the method, a description is given of the scheduling of the virtual machines with reference to FIGS. 16 and 17.

Referring to FIG. 17, an example of the virtual machine schedule table b334 which is held by the hypervisor (b330) is described first. The virtual machine schedule table b334 is a table that holds information for each user virtual machine b310 about how long the user virtual machine b310 runs on the physical computer.

The virtual machine schedule table b334 includes, for example, a user virtual machine ID c301, a continuous running time c302, an executability flag c303, and an execution status c304. Each virtual machine maintains the state of being executed for the length of the continuous running time only when the executability flag is "executable". For example, in the case of the virtual machine schedule table b334 of FIG. 17, three user virtual machines, 1, 2, and 3, are put into operation in turns.

Specifically, the user virtual machine 1 runs for ten milliseconds, then the user virtual machine 2 runs for ten milliseconds, then the user virtual machine 3 runs for five milliseconds, then the user virtual machine 1 runs again for ten milliseconds, the user virtual machine 2 runs again for ten milliseconds, and the user virtual machine 3 runs again for five milliseconds. The user virtual machine 4 is not put into operation because the executability flag is "inexecutable". The operation of the virtual machine scheduler b333 which is a program for accomplishing this is described next with reference to FIG. 16.

Figure 16:
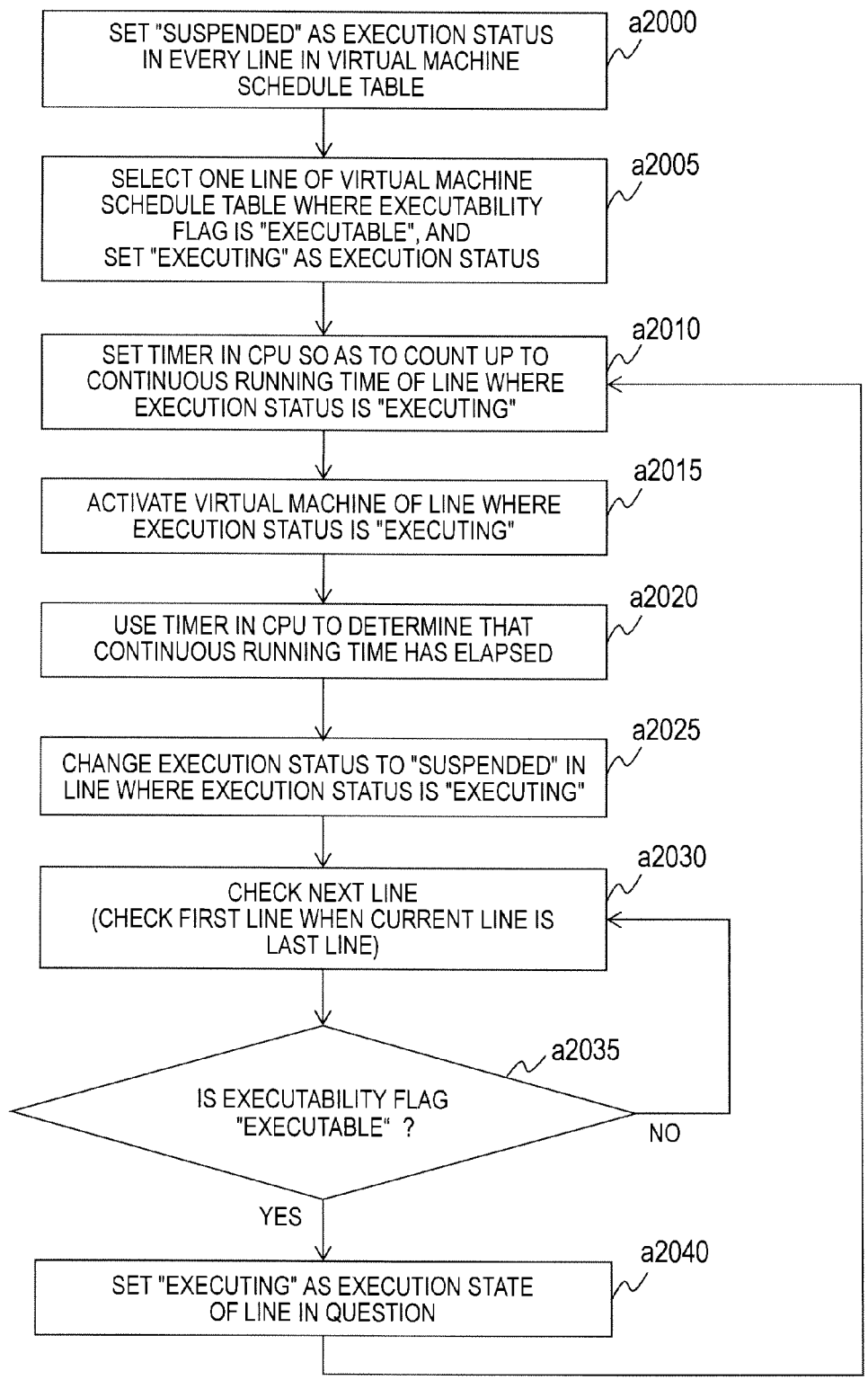
FIG. 16 is a flow chart illustrating an operation example of a virtual machine scheduler.

A description is given with reference to FIG. 16 of an operation that is executed by the virtual machine scheduler b333 within the hypervisor (b330). The hypervisor (b330) first executes a step a2000 in which the execution status is set to "suspended" in every line in the virtual machine schedule table b334. The hypervisor (b330) next executes a step a2005 in which one line where the executability flag is "executable" is selected from the virtual machine schedule table b334 and the execution status in the selected line is set to "executing". Any line where the executability flag is "executable" can be selected in a2005. For example, a line at the top or the bottom of the table is selected, or a randomly selected line is used. A step a2010 is then executed in which the timer b21 within the CPU (b2) is set so as to count up to a continuous running time of a line where the execution status is "executing". The continuous running time used in a2010 is a continuous running time of the line selected in the step a2005 in the case where the step a2010 is executed immediately after the step a2005, and a continuous running time of a line selected in a step a2040, which is described later, in the case where the step a2010 is executed immediately after a2040 is executed.

A step a2015 is executed next in which the virtual machine of the line where the execution status is "executing" is put into operation. In the following step a2020, the timer b21 finishes counting up to the time set in the step a2010, and the completion of the counting is used as a trigger for proceeding to a step a2025. The completion of the counting on the timer b21 can be monitored by, for example, regularly monitoring the timer b21 within the CPU (b2), or, in the case where the timer b21 has a mechanism of sending an interrupt at the time of completion of the counting on the timer b21 as a function of the timer b21, by enabling the interrupt.

In the step a2025, the execution status is changed to "suspended" in the line where "executing" is currently set as the execution status. The hypervisor (b330) then moves to the next line in a step a2030. In a step a2035, whether or not the executability flag of the line checked in the step a2030 is "executable" is determined. When the executability flag is "inexecutable", the hypervisor (b330) returns to the step a2035 and moves to lines ahead one by one. This is continued until a line where the executability flag is "executable" is found.

In the case where a line whose executability flag is "executable" is found in the step a2035, the step a2040 is executed to set "executing" to the execution status of this line, and the hypervisor (b330) then moves to the step a2010.

Only the user virtual machines b310 that have "executable" as the executability flag are thus put into operation in turns, to thereby avoid moving processing to the user virtual machine b310 that is written in a line where the executability flag is "inexecutable".

FIG. 7 merely differs from FIG. 2 in that steps a500 and a510 are used in place of the steps a102 and a105, and that a step a525 is executed after the step a115. Those three steps alone are therefore described.

The step a500 is described. In this embodiment, the error handling module b331 detects a reset of the PF (b51) in the step a100 of FIG. 2 and picks up virtual machines from the VF allocation table b332 to list virtual machines that are using the VF's (b52) within the same IOV device b50 as the reset target PF. For example, when the reset target PF (b51) has a PF identification number "1", the error handling module b331 refers to the VF allocation table of FIG. 6 to find that Line 1 and Line 2 meet the criteria. The user virtual machine ID c203 is 1 in both Line 1 and Line 2, and the virtual machine that has a virtual machine ID "1" is therefore the only virtual machine that is listed in this case. When the reset target PF (b51) has a PF identification number "2", on the other hand, lines that meet the criteria are Line 3 and Line 4, where the user virtual machine ID c203 is 1 and 2, and the virtual machine that has a virtual machine ID "1" and the virtual machine that has a virtual machine ID "2" are therefore the virtual machines listed in this case.

In the following step a510, the operation of the virtual CPU used by any listed virtual machine is stopped. A concrete operation of the hypervisor (b330) for accomplishing this may include, for example, removing the listed virtual machine from the scheduling of the scheduler for putting virtual machines in operation. For instance, in the case where the virtual machine schedule table b334 of FIG. 17 described above is used, the step a510 is accomplished by setting the executability flag to "inexecutable" for every virtual machine listed. As described above, a virtual machine whose executability flag is "inexecutable" is taken off the scheduling roster and is given other values than "executing" as the execution status.

Lastly, the step a525 is described. The virtual CPU of the user virtual machine that has been stopped in the step a510 is let resume its operation. This step is accomplished by executing processing opposite to a510. For example, in the case where a virtual machine has been removed in a510 from the scheduling of the scheduler for putting virtual machines into operation, the virtual machine is added back to the scheduling. This step is accomplished by, for example, changing the executability flag of the listed virtual machine to "executable".

The configurations and operations of a physical computer, virtual machines, and virtual machine system according to the second embodiment are applicable to any virtual machine system in which the hypervisor (b330) performs the scheduling of the user virtual machines b310, and enable a system that does not have the address protection mechanism b6, for example, to avoid the shutdown of the physical computer.

Third Embodiment

Figure 8:
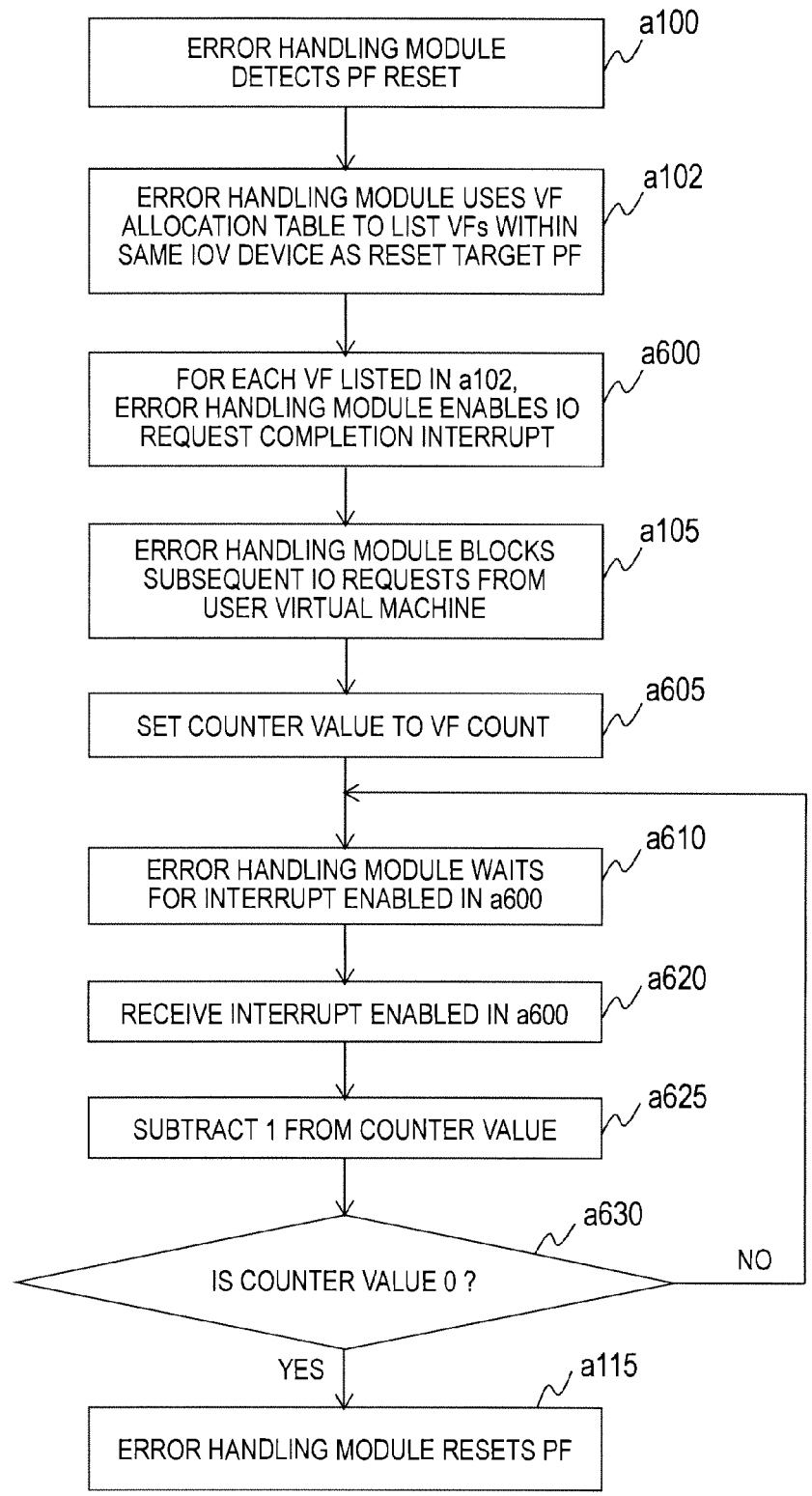
FIG. 8 is a flow chart for confirming the completion of IO processing of a VF by utilizing an interrupt of the VF.

A third embodiment of this invention describes, with reference to FIG. 8, a method of accomplishing the step a110 of FIG. 2 that is different from the one in the first embodiment. The method of this embodiment is premised on an IOV device whose configuration is unique among general IOV devices. FIG. 8 differs from FIG. 2 in that a110 is replaced by additional steps, a600, a605, a610, a615, a620, a625, and a630. Those newly added steps alone are therefore described.

Figure 21:
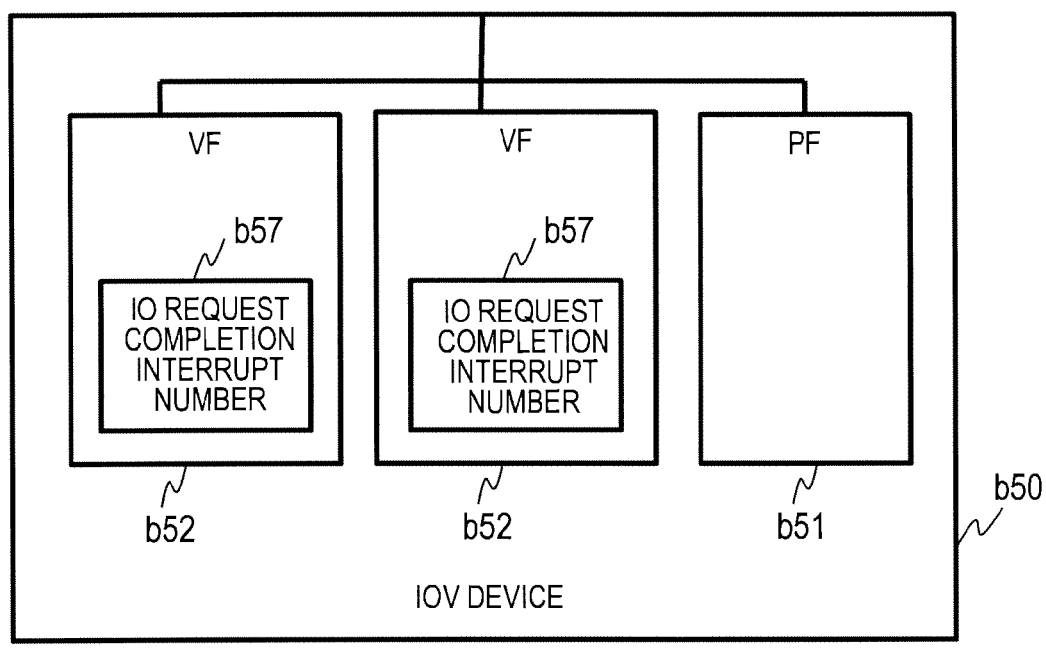
FIG. 21 is a block diagram illustrating a configuration example of an IOV device.

The unique configuration of the IOV device is described first with reference to FIG. 21. Each VF (b52) within the IOV device b50 includes an IO request completion interrupt number recording area b57. An interrupt number set in the IO request completion interrupt number recording area b57 of the VF (b52) is used to send an interrupt to a virtual machine or the hypervisor (b30) at an appropriate timing. The appropriate timing exercised by setting an interrupt number in the IO request completion interrupt number recording area of a VF is the time of completion of IO requests made to the VF.

A Procedure executed by the error handling module b331 is described next with reference to FIG. 8. In the step a600, the error handling module b331 first enables, for every VF listed in the step a105, an interrupt to be sent to the hypervisor (b30) at the time of completion of IO requests. In other words, the error handling module b331 sets an interrupt number in the IO request completion interrupt number recording area. An interrupt is thus sent to the hypervisor (b30) with respect to each listed VF at the time when IO requests to the VF are completed. The error handling module b331 next sets the counter value to the VF count in the step a605. This preparation is for confirming that an interrupt has been sent with respect to every VF.

In the step a610, the error handling module b331 waits for the arrival of the interrupt enabled in the step a600, and receives the interrupt in a620. When receiving the interrupt, the error handling module b331 subtracts 1 from the counter value set in a600. In the step a630, the error handling module b331 checks whether the counter value is 0 in order to confirm that the interrupt received in a620 is the last of the interrupts enabled in a600 and that all of the enabled interrupts have now arrived. When the counter value is 0, the error handling module b331 determines that all interrupts have arrived and proceeds to the step a115. Otherwise, the error handling module b331 returns to the step a610. For example, in the case where interrupts are enabled for ten VFs in a600, the error handling module b331 takes the "NO" branch from a630 nine times, and then takes the "YES" branch at the tenth execution of a630.

The configurations and operations of a physical computer, virtual machines, and virtual machine system according to the third embodiment have an advantage of being realized merely by enabling a device to deal with a unique interrupt, without using specific standards such as PCI.

The third embodiment has now been described.

Fourth Embodiment

Figure 9:
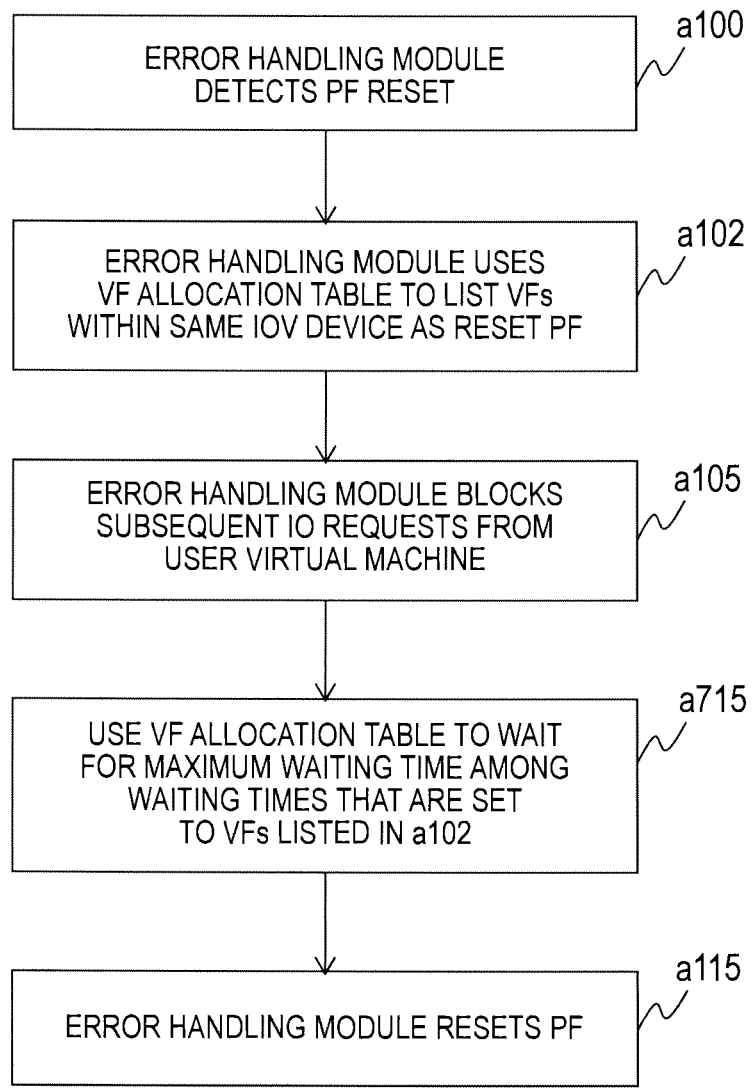
FIG. 9 is a flow chart for a procedure of waiting for a waiting time set to a VF which is executed by the error handling module to confirm the completion of IO processing of the VF.

A fourth embodiment of this invention describes, with reference to FIG. 9, a method of accomplishing the step a110 of FIG. 2 that is different from the one in the first embodiment or the third embodiment. A detailed description is therefore given of a715 alone which is a procedure that replaces a110.

In a715, the VF allocation table b332 is referred to for the VFs (b52) listed in a102 to obtain the waiting times c205 associated with the reset target PF (b51), and to wait for the maximum waiting time among the obtained waiting times. The case of the VF allocation table b332 of FIG. 6 is described as an example. When the reset target PF of a100 has a PF identification number "1", Line 1 and Line 2 meet the criteria, and the error handling module b331 waits for the maximum waiting time of the waiting times of those two lines. The maximum waiting time in this case is ten milliseconds. When the reset target PF of a100 has a PF identification number "2", Line 3 and Line 4 meet the criteria, and the error handling module b331 waits for a hundred milliseconds in this case. The error handling module b331 waits for at least the maximum waiting time, and may wait for a longer period.

An example of a user interface for applying waiting times in the VF allocation table is a console screen illustrated in FIG. 10. PF identification numbers and VF identification numbers in the VF allocation table are output to this console so that only waiting times of the VF allocation table are updated. While this example uses PF identification numbers and VF identification numbers, other values may be used as long as waiting time values can be set for each VF separately. An interface for applying a waiting time on a PF-by-PF basis may also be employed.

A user can input appropriate values based on the specifications of the device, experience, and the like. How long a waiting time is appropriate depends greatly on the configurations of the device, the physical computer, and others. However, a user judges that, for example, it is safe to assume that waiting for one second is enough for the system to complete every IO processing procedure.

With the configurations and operations of a physical computer, virtual machines, and virtual machine system according to the fourth embodiment, specific standards such as PCI are unnecessary, there is also no need for a device to be capable of dealing with a unique interrupt as in the third embodiment, and the error handling module only needs values specified by a user to operate.

From the invention thus described, it will be obvious that the embodiments of the invention may be varied in many ways. For example, some elements of an embodiment may be omitted, replaced with elements of another embodiment or added to another embodiment without departing from the scope and spirit of the invention. Such variations are not to be regarded as a departure from the spirit and scope of the invention, and all such modifications as would be obvious to one skilled in the art are intended for inclusion within the scope of the following claims.

What is claimed is:

1. A computing machine, comprising:
   a memory for storing a first virtual machine, a second virtual machine, and a hypervisor, which manages the first virtual machine and the second virtual machine; and
   a shared IO device which is used by the first virtual machine and the second virtual machine,
   wherein the shared IO device comprises a physical IO device and a virtual IO device which is controlled by the physical IO device,
   wherein the first virtual machine comprises a first driver for controlling the physical IO device,
   wherein the second virtual machine comprises a second driver for controlling the virtual IO device,
   wherein, the hypervisor, in a case where the hypervisor detects that the first driver has transmitted a stop signal for stopping the physical IO device, is configured to:
   keep the stop signal from being transmitted to the shared IO device;
   determine whether or not a processing request that has been transmitted by the second driver to the virtual IO device has been completed; and
   stop the physical IO device with the completion of the processing request that has been transmitted by the second driver to the virtual IO device as a trigger.

2. The computing machine according to claim 1, further comprising a root bridge for managing a first connection between the first virtual machine and the physical IO device and a second connection between the second virtual machine and the virtual IO device,
   wherein the root bridge executes processing of shutting down the computing machine in a case where the processing request that has been transmitted by the second driver to the virtual IO device is not completed within a predetermined period.

3. The computing machine according to claim 1,
   wherein the virtual IO device executes received processing requests in order of reception, and
   wherein the hypervisor transmits a processing request to the virtual IO device and, in a case where the hypervisor detects completion of the processing request that has been transmitted by the hypervisor to the virtual IO device, the hypervisor determines that the processing request that has been transmitted by the second driver to the virtual IO device has been completed.

4. The computing machine according to claim 1,
   wherein the hypervisor manages an address of the virtual IO device that is used to control a connection between the second virtual machine and the virtual IO device, and
   wherein the hypervisor keeps the stop signal from being transmitted to the shared IO device by changing the managed address.

5. The computing machine according to claim 1, wherein the hypervisor keeps a processing request transmitted by the second driver to the virtual IO device from reaching the physical IO device after the first driver transmits the stop signal to the physical IO device.

6. The computing machine according to claim 1,
   wherein the computing machine comprises a plurality of shared IO devices each comprising a physical IO device and a virtual IO device,
   wherein the hypervisor manages physical IO devices and virtual IO devices controlled by the physical IO devices of the plurality of shared IO devices in association with each other, and wherein, the hypervisor, in a case where the hypervisor detects the transmission of the stop signal, is configured to:

select the virtual IO device associated with the physical IO device that is a destination of the stop signal, based on the association;

execute the determination about whether or not the processing request that has been transmitted by the second driver to the selected virtual IO device has been completed; and stop the physical IO device that is the destination of the stop signal with the completion of the processing request that has been transmitted by the second driver to the selected virtual IO device as a trigger.

7. The computing machine according to claim 1, wherein the virtual IO device sends an interrupt to the hypervisor in a case where a received processing request is completed, and wherein the hypervisor determines that the processing request that has been transmitted by the second driver to the virtual IO device has been completed, based on the interrupt.

8. The computing machine according to claim 1, wherein the shared IO device is a device compliant with SR-IOV, wherein the physical IO device is a Physical Function of the device compliant with the SR-IOV, and wherein the virtual IO device is a Virtual Function of the device compliant with the SR-IOV.

9. A control method for use in a computing machine, the computing machine comprising:

a memory for storing a first virtual machine, a second virtual machine, and a hypervisor, which manages the first virtual machine and the second virtual machine; and a shared IO device which is used by the first virtual machine and the second virtual machine, wherein the shared IO device is provided with a physical IO device and a virtual IO device, the physical IO device controls the virtual IO device, the first virtual machine is provided with a first driver for controlling the physical IO device, and the second virtual machine is provided with a second driver for controlling the virtual IO device, the control method comprising:

keeping, by the hypervisor, in a case where the hypervisor detects that the first driver has transmitted a stop signal for stopping the physical IO device, the stop signal from being transmitted to the shared IO device;

determining, by the hypervisor, whether or not a processing request that has been transmitted by the second driver to the virtual IO device has been completed; and stopping, by the hypervisor, the physical IO device with the completion of the processing request that has been transmitted by the second driver to the virtual IO device as a trigger.

10. The control method for use in a computing machine according to claim 9, comprising:

managing, by a root bridge in the computing machine, a first connection between the first virtual machine and the physical IO device and a second connection between the second virtual machine and the virtual IO device; and executing, by the root bridge, processing of shutting down the computing machine when the processing request that has been transmitted by the second driver to the virtual IO device is not completed within a predetermined period.

11. The control method for use in a computing machine according to claim 9, comprising:

executing, by the virtual IO device, received processing requests in order of reception;

transmitting, by the hypervisor, a processing request to the virtual IO device; and determining, by the hypervisor, in a case where the hypervisor detects completion of the processing request that has been transmitted by the hypervisor to the virtual IO device, that the processing request that has been transmitted by the second driver to the virtual IO device has been completed.

12. The control method for use in a computing machine according to claim 9, comprising:

managing, by the hypervisor, an address of the virtual IO device that is used to control a connection between the second virtual machine and the virtual IO device; and keeping, by the hypervisor, the stop signal from being transmitted to the shared IO device by changing the managed address.

13. The control method for use in a computing machine according to claim 9, comprising keeping, by the hypervisor, a processing request from reaching the physical IO device transmitted by the second driver to the virtual IO device after the first driver transmits the stop signal to the physical IO device.

14. The control method for use in a computing machine according to claim 9, wherein the computing machine comprises a plurality of shared IO devices each comprising a physical IO device and a virtual IO device, and wherein the control method comprises:

managing, by the hypervisor, the physical IO devices and the virtual IO devices controlled by the physical IO device of the plurality of shared IO devices in association with each other;

selecting, by the hypervisor, in a case where the hypervisor detects the transmission of the stop signal, the virtual IO device associated with the physical IO device that is a destination of the stop signal, based on the association;

determining, by the hypervisor, the about whether or not the processing request that has been transmitted by the second driver to the selected virtual IO device has been completed; and stopping, by the hypervisor, the physical IO device that is the destination of the stop signal with the completion of the processing request that has been transmitted by the second driver to the selected virtual IO device as a trigger.

15. The control method for use in a computing machine according to claim 9, wherein the shared IO device is a device compliant with SR-IOV, wherein the physical IO device is a Physical Function of the device compliant with the SR-IOV, and wherein the virtual IO device is a Virtual Function of the device compliant with the SR-IOV.

* * * * *